(12) United States Patent
Fukutome et al.

(10) Patent No.: US 8,456,712 B2
(45) Date of Patent: Jun. 4, 2013

(54) IMAGE READING APPARATUS, IMAGE FORMING APPARATUS, AND IMAGE PROCESSING APPARATUS

(75) Inventors: Shohichi Fukutome, Osaka (JP); Mitsuharu Yoshimoto, Osaka (JP); Norio Tomita, Osaka (JP); Takeshi Mutoh, Osaka (JP); Kazuma Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 716 days.

(21) Appl. No.: 12/704,655

(22) Filed: Feb. 12, 2010

(65) Prior Publication Data

US 2010/0208306 A1    Aug. 19, 2010

(30) Foreign Application Priority Data

Feb. 18, 2009    (JP) ................. 2009-035558

(51) Int. Cl.
*H04N 1/36*    (2006.01)
(52) U.S. Cl.
USPC ......................................... 358/412; 358/474
(58) Field of Classification Search
USPC ................... 358/1.2, 1.5, 406, 412, 448, 468, 358/474, 488, 496, 498
See application file for complete search history.

(56) References Cited

U.S. PATENT DOCUMENTS

| | | | | |
|---|---|---|---|---|
| 4,888,650 A * | 12/1989 | Abuyama | .................... | 358/451 |
| 4,943,871 A * | 7/1990 | Miyagawa | ................... | 358/496 |
| 5,245,440 A * | 9/1993 | Sato | ............... | 358/406 |
| 5,912,747 A * | 6/1999 | Murakami | .................... | 358/497 |
| 6,744,540 B1 | 6/2004 | Masuda et al. | | |
| 6,859,636 B2 * | 2/2005 | Mitomi | ......................... | 399/367 |
| 6,917,442 B1 * | 7/2005 | Eguchi | ........................... | 358/1.6 |
| 8,238,000 B2 * | 8/2012 | Van Der Heijden | ......... | 358/504 |
| 2006/0198624 A1 * | 9/2006 | Ono et al. | ..................... | 396/133 |
| 2007/0059029 A1 * | 3/2007 | Kishi et al. | ................... | 399/101 |
| 2007/0081212 A1 * | 4/2007 | Tonami et al. | ................ | 359/197 |
| 2007/0171487 A1 * | 7/2007 | Chen | ............. | 358/498 |
| 2007/0291326 A1 * | 12/2007 | Morita et al. | ................. | 358/474 |
| 2010/0245944 A1 * | 9/2010 | Fukutome et al. | ............ | 358/488 |
| 2012/0081715 A1 * | 4/2012 | Takano | ......................... | 358/1.5 |
| 2013/0051817 A1 * | 2/2013 | Tomita et al. | ................... | 399/15 |
| 2013/0052350 A1 * | 2/2013 | Tomita et al. | ................. | 427/256 |

FOREIGN PATENT DOCUMENTS

| | | |
|---|---|---|
| JP | 01-300670 | 12/1989 |
| JP | 03-158066 | 7/1991 |
| JP | 04-292064 | 10/1992 |
| JP | 07-162604 | 6/1995 |
| JP | 09-081009 | 3/1997 |
| JP | 2001-77986 A | 3/2001 |
| JP | 2001-189830 | 7/2001 |

* cited by examiner

*Primary Examiner* — Kimberly A Williams
(74) *Attorney, Agent, or Firm* — Renner, Otto, Boisselle & Sklar, LLP

(57) ABSTRACT

In one embodiment, image reading apparatuses 100a and 100b start reading an original image after a reading start time Ta has elapsed since detecting the transport timing of an original G on the upstream side in a transport direction Y1 relative to an original reading position R1, adjust the reading start time Ta based on a reading timing adjustment time T1*a* from when the transport timing of an adjustment sheet P is detected until when original reading portions 200a and 200b read a position considered to be a leading edge P' in a first mark Q1 on the adjustment sheet P, and correct the reading start timing of the original G based on a leading edge reading error correction time T2*a* stored in advance.

18 Claims, 9 Drawing Sheets

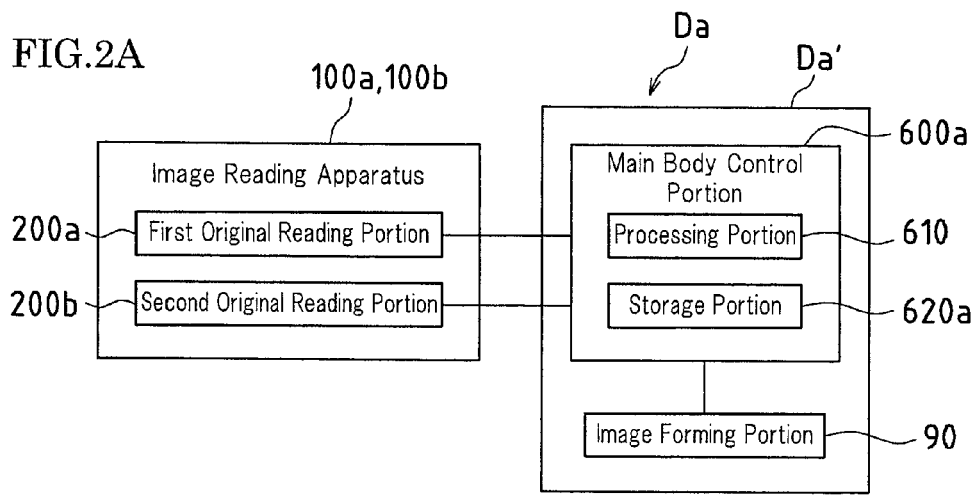
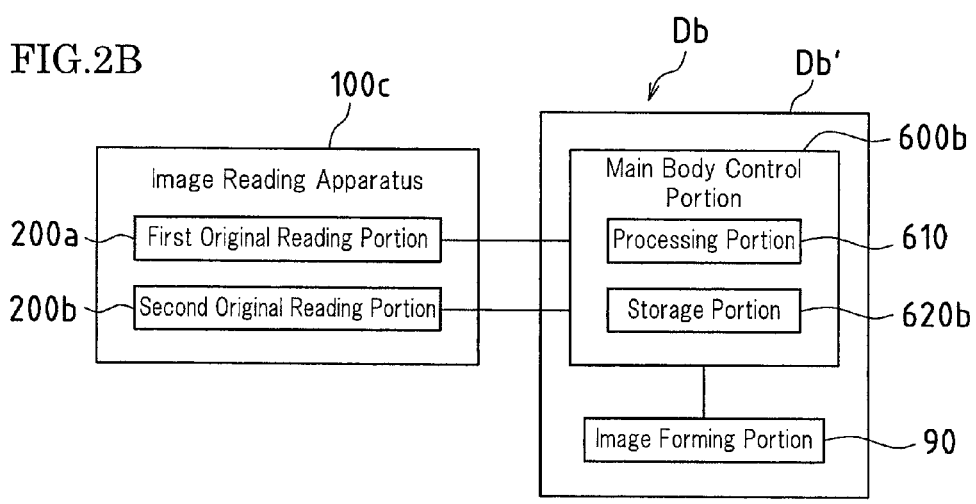
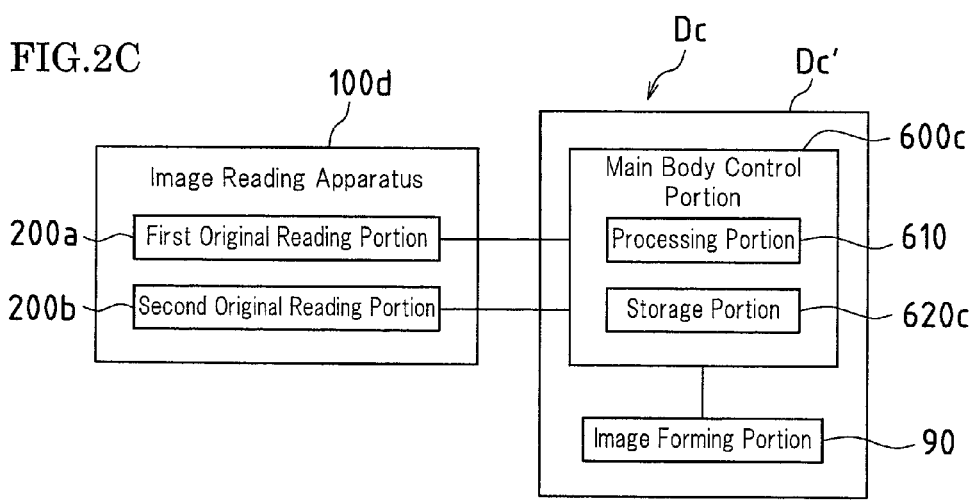

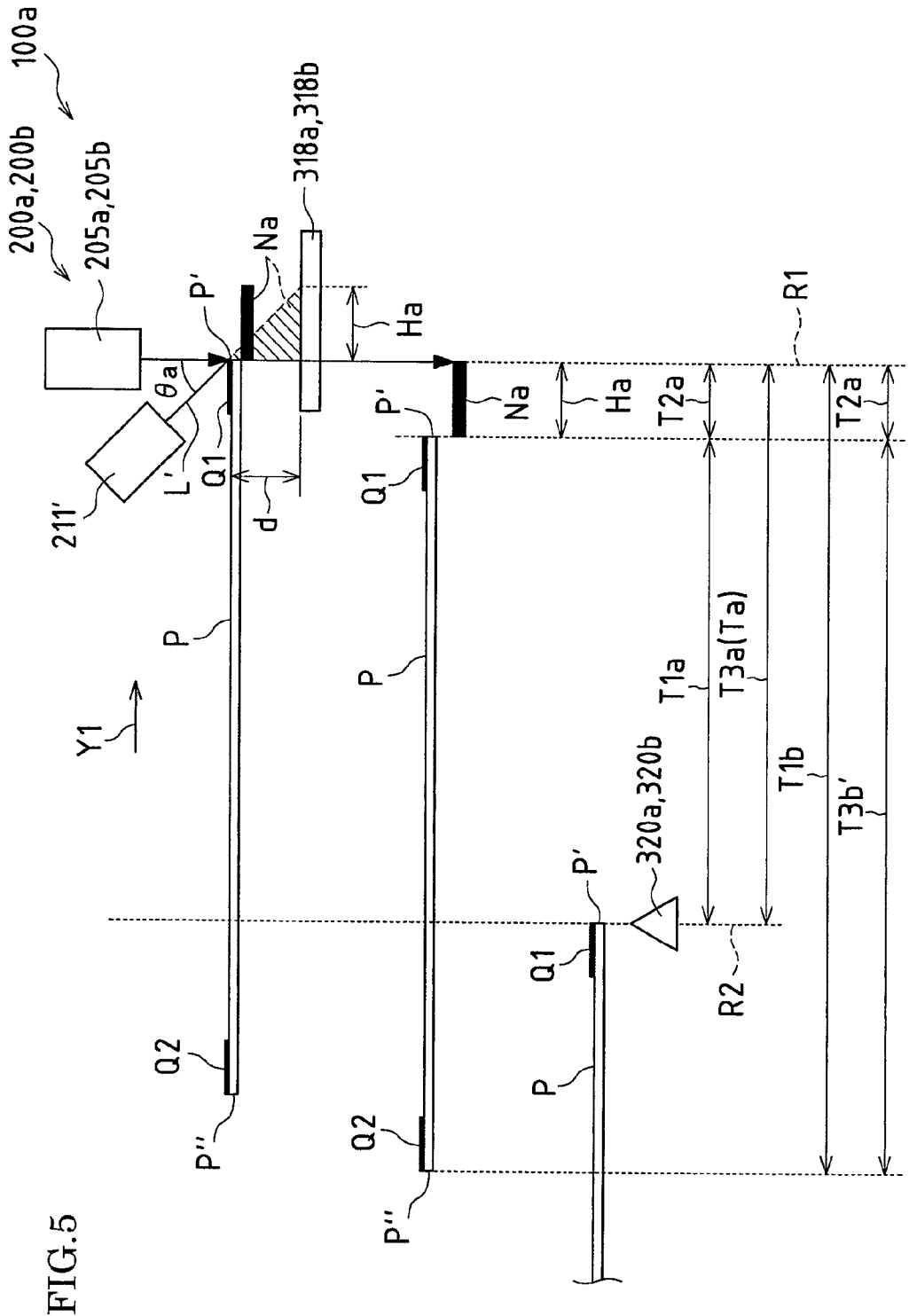

IMAGE READING APPARATUS, IMAGE FORMING APPARATUS, AND IMAGE PROCESSING APPARATUS

CROSS-REFERENCE TO RELATED APPLICATION

This application claims priority under 35 U.S.C. §119(a) on Patent Application No. 2009-035558 filed in Japan on Feb. 18, 2009, the entire contents of which are herein incorporated by reference.

BACKGROUND OF THE INVENTION

1. Field of the Invention

The present invention relates to an image reading apparatus using a moving original method, an image forming apparatus, and an image processing apparatus.

2. Related Art

An image reading apparatus provided in an image forming apparatus such as a copying machine, a facsimile machine, or a digital multifunction peripheral, and an image reading apparatus connected to an image processing apparatus such as a computer via a communication means such as a network, are used as image reading means when, for example, based on image information output from an original reading portion that reads an original image, transferring print images to an image forming portion, transmitting print images to the image processing apparatus such as a computer (for example, a personal computer) connected to the network, and the like. Such an image processing apparatus may create prescribed image data such as PDF (Portable Document Format) data based on image information from the image reading apparatus, for example.

As conventional image reading apparatuses, many image reading apparatuses are utilized that use a moving original method in which the original reading portion reads, in a prescribed original reading position, image light from an original that is irradiated with light from a light source such as a lamp of the original reading portion while being transported in a prescribed transport direction at a prescribed transport speed by an original transport portion.

Ordinarily, such an image reading apparatus using a moving original method starts reading an original image after a reading start time set in advance has elapsed since detecting the transport timing of an original on the upstream side in the transport direction relative to the original reading position (for example, an original detecting portion such as an original detection sensor detects the downstream side edge (leading edge) in the transport direction of the original). This reading start time can be set to the time in which an original is transported from the detection position of the transport timing detected by the original detecting portion to the original reading position where reading is performed by the original reading portion, for example.

With such an image reading apparatus, when the original detecting portion and the original reading portion are attached at a factory, or when the original detecting portion and the original reading portion are adjusted or replaced by an operator such as a serviceman, due to variation in the mounting positions of the original detecting portion and the original reading portion, variation among components, and the like, the transport distance from the detection position of the transport timing detected by the original detecting portion to the original reading position where reading is performed by the original reading portion may vary between image reading apparatuses. Accordingly, ordinarily, at the time of factory shipment, or at the time of component adjustment or component replacement performed by an operator such as a serviceman, the reading start time is adjusted according to such variation.

Adjustment of the reading start time is performed by causing an image reading apparatus to be adjusted to actually transport an adjustment sheet, for example (see JP H3-158066A).

Specifically, the reading start time is adjusted so as to match a reading timing adjustment time from when the original detecting portion detects the leading edge of the adjustment sheet transported by the original transport portion on the upstream side in the transport direction relative to the original reading position until when the original reading portion reads a position considered to be the leading edge of the adjustment sheet, for example.

Further, with an image reading apparatus using a moving original method, when transport system components that constitute the original transport portion are attached at a factory, or when such transport system components are adjusted or replaced by an operator such as a serviceman, due to variation in the mounting positions of the transport system components, variation among the components, and the like, the read magnification (for example, transport speed) in the transport direction may differ from the original read magnification. Thus, ordinarily, the read magnification is adjusted at the time of factory shipment, or at the time of component adjustment or component replacement performed by an operator such as a serviceman.

This read magnification is adjusted such that, for example, a read magnification adjustment time from when the original reading portion reads a position considered to be the leading edge of an adjustment sheet until when the original reading portion reads a position considered to be the upstream side edge (trailing edge) in the transport direction of the adjustment sheet matches a reference transport time set in advance for the adjustment sheet.

However, in such an image reading apparatus using a moving original method, reading errors may occur, such as the original reading portion reading a position earlier than (before) the actual leading edge position when reading the leading edge of the adjustment sheet, or the original reading portion reading a position later than (behind) the actual trailing edge position when reading the trailing edge of the adjustment sheet. This is described below with reference to FIGS. 8A and 8B.

FIGS. 8A and 8B are schematic side views that illustrate reading errors that occur in image reading apparatuses 100' and 100" using a moving original method. FIG. 8A shows an example of a reading error that occurs in the image reading apparatus 100' when a leading edge P' of an adjustment sheet P is read by an image sensor 205 of an original reading portion 200' in which a light source 211' is disposed on the upstream side in a transport direction Y1, taking an original reading position R1 as a reference. FIG. 8B shows an example of a reading error that occurs in the image reading apparatus 100" when a trailing edge P" of the adjustment sheet P is read by an image sensor 205 of an original reading portion 200" in which a light source 211" is disposed on the downstream side in the transport direction Y1, taking the original reading position R1 as a reference. Further, FIG. 9 shows a state in which the light sources 211' and 211" are respectively disposed on the upstream side and downstream side in the transport direction Y1, taking the original reading position R1 as a reference. Note that in FIGS. 8A, 8B, and 9, reference numerals 201 and 319 respectively denote an original reading glass and reading member glass.

In the image reading apparatus 100' shown in FIG. 8A, the light source 211' is disposed on the upstream side in the transport direction Y1, taking the original reading position R1 as a reference, and a reading start time Ta is adjusted using a first mark Q1 on the adjustment sheet P, which has the first mark Q1 formed at least at the leading edge P'. Further, a reading member (for example, a white plate) 318 that is read by the original reading portion 200' when an original is not being transported is provided on the side opposite to the reading side of the original reading position R1, with an original transport path 303 between the original reading portion 200' and the reading member 318.

At least the surface of the reading member 318 is formed so as to have a lighter darkness (darkness whose difference from the darkness of the first mark Q1 can be recognized when the original reading portion 200' performs reading (usually white)) than the first mark Q1 (usually black). In this way, when the first mark Q1 on the adjustment sheet P has not arrived, the reflected light from the reading member 318 enters the image sensor 205 of the original reading portion 200'. On the other hand, when the first mark Q1 on the adjustment sheet P has arrived, the reflected light from the first mark Q1, which is darker than the reflected light from the reading member 318, enters the image sensor 205 of the original reading portion 200', or the reflected light from the reading member 318 is interrupted. Accordingly, the image reading apparatus 100' can recognize the leading edge P' of the adjustment sheet P when the position considered to be the leading edge P' in the first mark Q1 on the adjustment sheet P is read.

Then, for adjustment using the adjustment sheet P, a reading timing adjustment time T1a is measured that is a time from when an original detection sensor 320 detects the leading edge P' of the adjustment sheet P transported by the original transport portion (not shown) in the transport direction Y1 at a prescribed transport speed V, on the upstream side in the transport direction Y1 relative to the original reading position R1 until when the original reading portion 200' reads a position considered to be the leading edge P' in the first mark Q1 on the adjustment sheet P. The reading start time Ta is adjusted based on the reading timing adjustment time T1a measured in this way. For example, if the reading start time Ta is a time from when the original detection sensor 320 detects the leading edge P' of the adjustment sheet P until when the original reading portion 200' reads the leading edge P' of the adjustment sheet P, the reading start time Ta is adjusted such that the reading start time Ta matches the reading timing adjustment time T1a obtained by measurement.

With such a configuration, since the light source 211' is disposed on the upstream side in the transport direction Y1, taking the original reading position R1 as a reference, the light irradiation surface is irradiated with light L' from the light source 211' from a diagonally upstream side, resulting in the occurrence of shadow Na (for example, a shadow whose width is approximately 0.7 mm) at the leading edge P' of the adjustment sheet P. Then, even though the image reading apparatus 100' intends to read the leading edge P' of the adjustment sheet P when reading the leading edge P' of the adjustment sheet P in the original reading position R1, the image reading apparatus 100' actually determines the shadow Na at the leading edge P' of the adjustment sheet P due to the light L' from the light source 211' as the mark Q1, and reads a leading edge Na' of the shadow Na as the leading edge P' of the adjustment sheet P.

Specifically, there are problems in that even with the intention of reading the leading edge P' of the adjustment sheet P, although the leading edge P' of the adjustment sheet P has not been transported to the original reading position R1, the leading edge Na' of the shadow Na at the leading edge P' is unintentionally read earlier than the leading edge P'. In this case, the leading edge P' of the adjustment sheet P cannot be read with sufficient accuracy when performing adjustment using the adjustment sheet P. Therefore, when reading an original, an original image cannot be read at an accurate reading start timing. Alternatively, in an image forming apparatus and an image processing apparatus to which such an image reading apparatus is connected, since image information from this image reading apparatus is shifted in the original transport direction from the normal image position, a print image is printed on a recording sheet with the printed image shifted in the transport direction from the normal image position in the image forming apparatus, or image data is created shifted in the transport direction from the normal image position in the image processing apparatus.

Note that such problems may occur in a case in which even though, as shown in FIG. 9, the light sources 211' and 211" are disposed respectively on both of the upstream side and the downstream side in the transport direction Y1, taking the original reading position R1 as a reference, the light amount of the light L' from the light source 211' on the upstream side is greater than the light amount of light L" from the light source 211" on the downstream side.

Further, with the image reading apparatus 100" shown in FIG. 8B, the light source 211" is disposed on the downstream side in the transport direction Y1, taking the original reading position R1 as a reference, and the read magnification in the transport direction Y1 is adjusted using the first mark Q1 and a second mark Q2 on the adjustment sheet P, which has the first mark Q1 formed at least at the leading edge P', and the second mark Q2 formed at least at the trailing edge P'''.

The darkness of the second mark Q2 is about the same as that of the first mark Q1 described above. Therefore, when the second mark Q2 on the adjustment sheet P has not arrived, the reflected light from the reading member 318 enters the image sensor 205 of the original reading portion 200". On the other hand, when the second mark Q2 on the adjustment sheet P has arrived, the reflected light from the second mark Q2, which is darker than the reflected light from the reading member 318, enters the image sensor 205 of the original reading portion 200", or the reflected light from the reading member 318 is interrupted. Accordingly, the image reading apparatus 100" can recognize the trailing edge P''' of the adjustment sheet P when the position considered to be the trailing edge P''' in the second mark Q2 on the adjustment sheet P is read.

Then, for adjustment using the adjustment sheet P, a read magnification adjustment time T1b is measured that is a time from when the original reading portion 200" reads a position considered to be the leading edge P' in the first mark Q1 on the adjustment sheet P until when the original reading portion 200" reads a position considered to be the trailing edge P''' in the second mark Q2 on the adjustment sheet P.

The read magnification is adjusted based on the read magnification adjustment time T1b measured in this way. For example, if the read magnification adjustment time T1b is shorter than a reference transport time Ts set in advance for the adjustment sheet P, the read magnification is adjusted by decreasing the transport speed V by the difference between the read magnification adjustment time T1b and the reference transport time Ts such that the read magnification matches the original read magnification. On the other hand, if the read magnification adjustment time T1b is longer than the reference transport time Ts, the read magnification is adjusted by increasing the transport speed V by the difference between the read magnification adjustment time T1b and the reference transport time Ts such that the read magnification matches the original read magnification.

With such a configuration, since the light source 211" is disposed on the downstream side in the transport direction Y1, taking the original reading position R1 as a reference, the light irradiation surface is irradiated with the light L" from the light source 211" from a diagonally downstream side, resulting in the occurrence of shadow Nb (for example, a shadow whose width is approximately 0.7 mm) at the trailing edge P''' of the adjustment sheet P. Then, even though the image reading apparatus 100" intends to read the trailing edge P''' of the adjustment sheet P when reading the trailing edge P''' of the adjustment sheet P in the reading position R1, the image reading apparatus 100" actually determines the shadow Nb at the trailing edge P''' of the adjustment sheet P due to the light L" from the light source 211" as the mark Q2, and reads a trailing edge Nb" of the shadow Nb as the trailing edge P''' of the adjustment sheet P.

Specifically, there are problems in that even with the intention of reading the trailing edge P''' of the adjustment sheet P, although the trailing edge P''' of the adjustment sheet P has already been transported to the original reading position R1, the trailing edge P''' is not read, rather, the trailing edge Nb" of the shadow Nb at the trailing edge P''' is unintentionally read later than the trailing edge P'''. In this case, the trailing edge P''' of the adjustment sheet P cannot be read with sufficient accuracy when performing adjustment using the adjustment sheet P. Therefore, when reading an original, an original image cannot be read at an accurate read magnification. Alternatively, in the image forming apparatus and the image processing apparatus to which such an image reading apparatus is connected, since image information from this image reading apparatus is different image information in the original transport direction from that read at the normal magnification, a print image is printed on a recording sheet at a different magnification in the transport direction from the normal magnification in the image forming apparatus, or image data is created at a different magnification in the transport direction from the normal magnification in the image processing apparatus.

Note that such problems may occur in a case in which even though, as shown in FIG. 9, the light sources 211' and 211" are disposed respectively on both of the upstream side and the downstream side in the transport direction Y1, taking the original reading position R1 as a reference, the light amount of the light L" from the light source 211" on the downstream side is greater than the light amount of the light L' from the light source 211' on the upstream side.

SUMMARY OF THE INVENTION

The present invention has been conceived in view of the above problems, and provides an image reading apparatus capable of reading the downstream side edge (leading edge) in the transport direction of an adjustment sheet with sufficient accuracy when performing adjustment using the adjustment sheet, and accordingly capable of reading an original image at an accurate reading start timing when reading an original, and an image forming apparatus.

Further, the present invention provides an image reading apparatus capable of reading the upstream side edge (trailing edge) in the transport direction of an adjustment sheet with sufficient accuracy when performing adjustment using the adjustment sheet, and accordingly capable of reading an original image at an accurate read magnification when reading an original, and an image forming apparatus.

Further, the present invention provides an image forming apparatus provided with an image reading apparatus, the image forming apparatus being capable of printing a print image on a recording sheet in a normal image position in the transport direction even though the image reading apparatus reads a position earlier than the actual downstream side edge position when reading the downstream side edge in the transport direction of an adjustment sheet.

Further, the present invention provides an image forming apparatus provided with an image reading apparatus, the image forming apparatus being capable of printing a print image on a recording sheet at a normal magnification in the transport direction even though the image reading apparatus reads a position later than the actual upstream side edge position when reading the upstream side edge in the transport direction of an adjustment sheet.

Further, the present invention provides an image processing apparatus to which an image reading apparatus is connected, the image processing apparatus being capable of creating image data in a normal image position in the transport direction even though the image reading apparatus reads a position earlier than the actual downstream side edge position when reading the downstream side edge in the transport direction of an adjustment sheet.

Further, the present invention provides an image processing apparatus to which an image reading apparatus is connected, the image processing apparatus being capable of creating image data at a normal magnification in the transport direction even though the image reading apparatus reads a position later than the actual upstream side edge position when reading the upstream side edge in the transport direction of an adjustment sheet.

In order to solve the above problems, the present invention provides an image reading apparatus of the following first mode, and an image forming apparatus of the first mode provided with the same.

(1) Image Reading Apparatus of First Mode

The present invention provides an image reading apparatus, including: a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and a reading timing adjustment section that adjusts the reading start time using a first mark on an adjustment sheet, which has the first mark formed at least at a downstream side edge (a leading edge) in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and the image reading apparatus correcting a reading start timing of an original based on downstream side edge reading error correction information stored in advance.

(2) Image Forming Apparatus of First Mode

The present invention provides an image forming apparatus provided with the image reading apparatus of the first mode.

According to the image reading apparatus of the first mode according to the present invention and the image forming apparatus provided with the same, since the downstream side edge reading error correction information (for example, a time and a distance that correspond to a reading error at the downstream side edge) is stored in advance, even though the original reading portion reads a position earlier than the actual downstream side edge position when reading the downstream side edge in the transport direction of the adjustment sheet, by correcting the reading start timing of an original based on the downstream side edge reading error correction information stored in advance, an original image can be read at an accurate reading start timing when reading an original.

With the image reading apparatus of the first mode according to the present invention and the image forming apparatus provided with the same, it is particularly effective to adopt a configuration in which the light source emits light from at least the upstream side among the upstream side and a downstream side in the transport direction, taking the original reading position as a reference. Examples of such a mode include a mode in which the light source emits light only from the upstream side in the transport direction, taking the original reading position as a reference, and a mode in which the light source emits light from both of the upstream side and the downstream side in the transport direction, taking the original reading position as a reference, with the light amount on the upstream side being greater than the light amount on the downstream side.

In this case, the downstream side edge reading error correction information stored in advance may indicate a downstream side edge reading error correction time obtained by dividing a width in the transport direction of a shadow at the downstream side edge in the transport direction of the adjustment sheet due to light from the light source by the transport speed.

With the image reading apparatus of the first mode according to the present invention and the image forming apparatus provided with the same, in the case in which the downstream side edge reading error correction information indicates the downstream side edge reading error correction time, as the reading timing adjustment section, for example, a mode in which the reading start time is adjusted based on a reading timing correction adjustment time obtained by adding the downstream side edge reading error correction time to the reading timing adjustment time can be given as an example.

According to this specific aspect, the reading start timing can be corrected using a comparatively simple control configuration in which the downstream side edge reading error correction time is added to the reading timing adjustment time.

In this case, for example, if the reading start time matches a time from when the downstream side edge in the transport direction in the first mark on the adjustment sheet is detected until when the original reading portion reads a position considered to be a downstream side edge in the transport direction in the first mark on the adjustment sheet, the reading start time can be adjusted with sufficient accuracy by using the reading start time as the reading timing correction adjustment time.

In the image reading apparatus of the first mode according to the present invention and the image forming apparatus provided with the same, the adjustment sheet may further have a second mark that is formed at least at an upstream side edge (trailing edge) in the transport direction.

According to this specific aspect, similar to an image reading apparatus of a second mode according to the present invention described later, it is possible to provide a read magnification adjustment section.

Specifically, with the image reading apparatus of the first mode according to the present invention and the image forming apparatus provided with the same, it is possible to further provide a read magnification adjustment section that adjusts a read magnification in the transport direction set in advance using the first mark and the second mark on the adjustment sheet, the read magnification adjustment section adjusting the read magnification based on a read magnification adjustment time from when the original reading portion reads a position considered to be the downstream side edge in the transport direction in the first mark on the adjustment sheet until when the original reading portion reads a position considered to be the upstream side edge in the transport direction in the second mark on the adjustment sheet. In this case, it is possible to correct the read magnification based on the downstream side edge reading error correction information.

According to this specific aspect, even though the original reading portion reads a position earlier than the actual downstream side edge position when reading the downstream side edge in the transport direction of the adjustment sheet, by correcting the read magnification based on the downstream side edge reading error correction information, the read magnification can be properly adjusted and, accordingly, an original image can be read at an accurate read magnification when reading an original.

With the image reading apparatus of the first mode according to the present invention and the image forming apparatus provided with the same, in a case in which the downstream side edge reading error correction information indicates the downstream side edge reading error correction time, a mode in which the read magnification adjustment section adjusts the read magnification based on a read magnification correction adjustment time obtained by subtracting the downstream side edge reading error correction time from the read magnification adjustment time can be given as an example.

According to this specific aspect, the read magnification can be corrected using a comparatively simple control configuration in which the downstream side edge reading error correction time is subtracted from the read magnification adjustment time.

In the image reading apparatus of the first mode according to the present invention and the image forming apparatus, it is preferable that on the adjustment sheet, one or two or more of the first marks are formed along a direction that is orthogonal to the transport direction.

According to this specific aspect, even in a case in which the adjustment sheet is diagonally fed, it is possible to make the variations of timings at which the original reading portion reads the first mark uniform.

For example, the reading timing adjustment section can use a time obtained by averaging each time from when the transport timing of the adjustment sheet is detected until when the original reading portion reads two or more positions considered to be the downstream side edge that correspond to the first marks on the adjustment sheet as the reading timing adjustment time.

Further, in order to solve the above problems, the present invention provides the image reading apparatus of the following second mode, and an image forming apparatus of the second mode provided with the same.

(3) Image Reading Apparatus of Second Mode

The present invention provides an image reading apparatus, including: a reading section that reads, in a prescribed original reading position using an original reading portion, image light from an original that is irradiated with light from a light source of the original reading portion while being transported in a prescribed transport direction at a prescribed transport speed by an original transport portion; and a read magnification adjustment section that adjusts a read magnification in the transport direction set in advance using a first mark and a second mark on an adjustment sheet, which has the first mark that is formed at least at a downstream side edge in the transport direction, and the second mark that is formed at least at an upstream side edge in the transport direction, the read magnification adjustment section adjusting the read magnification based on a read magnification adjustment time from when the original reading portion reads a position considered to be a downstream side edge in the transport direction in the first mark on the adjustment sheet until when the original reading portion reads a position considered to be an upstream side edge in the transport direction in the second mark on the adjustment sheet, and the image reading apparatus correcting the read magnification based on upstream side edge reading error correction information stored in advance.

(4) Image Forming Apparatus of Second Mode

The present invention provides an image forming apparatus provided with the image reading apparatus of the second mode.

According to the image reading apparatus of the second mode according to the present invention and the image forming apparatus provided with the same, since the upstream side edge reading error correction information (for example, a time and a distance that correspond to a reading error at the upstream side edge) is stored in advance, even though the original reading portion reads a position later than the actual upstream side edge position when reading the upstream side edge in the transport direction of the adjustment sheet, by correcting the read magnification based on the upstream side edge reading error correction information stored in advance, an original image can be read at an accurate read magnification when reading an original.

With the image reading apparatus of the second mode according to the present invention and the image forming apparatus provided with the same, it is particularly effective to adopt a configuration in which the light source emits light from at least a downstream side among an upstream side and the downstream side in the transport direction, taking the original reading position as a reference. Examples of such a mode include a mode in which the light source emits light only from the downstream side in the transport direction, taking the original reading position as a reference, and a mode in which the light source emits light from both of the upstream side and the downstream side in the transport direction, taking the original reading position as a reference, with the light amount on the downstream side being greater than the light amount on the upstream side.

In this case, the upstream side edge reading error correction information stored in advance may indicate an upstream side edge reading error correction time obtained by dividing a width in the transport direction of a shadow at the upstream side edge in the transport direction of the adjustment sheet due to light from the light source by the transport speed.

With the image reading apparatus of the second mode according to the present invention and the image forming apparatus provided with the same, in the case in which the upstream side edge reading error correction information indicates the upstream side edge reading error correction time, as the read magnification adjustment section, a mode in which the read magnification is adjusted based on a read magnification correction adjustment time obtained by subtracting the upstream side edge reading error correction time from the read magnification adjustment time can be given as an example.

According to this specific aspect, the read magnification can be corrected using a comparatively simple control configuration in which the upstream side edge reading error correction time is subtracted from the read magnification adjustment time.

Further, in order to solve the above problems, the present invention provides image forming apparatuses of the following third and fourth modes.

(5) Image Forming Apparatus of Third Mode

The present invention provides an image forming apparatus that prints a print image on a recording sheet from image information from an image reading apparatus including: a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and a reading timing adjustment section that adjusts the reading start time using a first mark on an adjustment sheet, which has the first mark formed at least at a downstream side edge in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and the image forming apparatus correcting an image position in the transport direction of the print image based on downstream side edge reading error correction information stored in advance.

According to the image forming apparatus of the third mode according to the present invention, since the downstream side edge reading error correction information (for example, a time and a distance that correspond to a reading error at the downstream side edge) is stored in advance, even though the original reading portion reads a position earlier than the actual downstream side edge position when reading the downstream side edge in the transport direction on the adjustment sheet, by correcting the image position in the transport direction of the print image based on the downstream side edge reading error correction information stored in advance, the print image can be printed on a recording sheet in a normal image position in the transport direction.

With the image forming apparatus of the third mode according to the present invention, in the case in which the adjustment sheet further has a second mark that is formed at least at an upstream side edge in the transport direction, and the image reading apparatus further includes a read magnification adjustment section that adjusts a read magnification in the transport direction set in advance using the first mark and the second mark on the adjustment sheet, the read magnification adjustment section adjusting the read magnification based on a read magnification adjustment time from when the original reading portion reads a position considered to be the downstream side edge in the transport direction in the first mark on the adjustment sheet until when the original reading portion reads a position considered to be the upstream side edge in the transport direction in the second mark on the adjustment sheet, the image forming apparatus can correct a magnification in the transport direction of the print image based on the downstream side edge reading error correction information.

According to this specific aspect, even though the original reading portion reads a position earlier than the actual downstream side edge position when reading the downstream side edge in the transport direction of the adjustment sheet, by correcting the magnification in the transport direction of the print image based on the downstream side edge reading error correction information stored in advance, the print image can be printed on a recording sheet at a normal magnification in the transport direction.

(6) Image Forming Apparatus of Fourth Mode

The present invention provides an image forming apparatus that prints a print image on a recording sheet from image information from an image reading apparatus including: a reading section that reads, in a prescribed original reading position using an original reading portion, image light from an original that is irradiated with light from a light source of the original reading portion while being transported in a prescribed transport direction at a prescribed transport speed by an original transport portion; and a read magnification adjustment section that adjusts a read magnification in the transport direction set in advance using a first mark and a second mark on an adjustment sheet that has the first mark formed at least at a downstream side edge in the transport direction, and the second mark formed at least at an upstream side edge in the transport direction, the read magnification adjustment section adjusting the read magnification based on a read magnification adjustment time from when the original reading portion reads a position considered to be a downstream side edge in the transport direction in the first mark on the adjustment sheet until when the original reading portion reads a position considered to be an upstream side edge in the transport direction in the second mark on the adjustment sheet, and the image forming apparatus correcting a magnification in the transport direction of the print image based on upstream side edge reading error correction information stored in advance.

According to the image forming apparatus of the fourth mode according to the present invention, since the upstream side edge reading error correction information (for example, a time and a distance that correspond to a reading error at the upstream side edge) is stored in advance, even though the original reading portion reads a position later than the actual upstream side edge position when reading the upstream side edge in the transport direction of the adjustment sheet, by correcting the magnification in the transport direction of the print image based on the upstream side edge reading error correction information stored in advance, the print image can be printed on a recording sheet at a normal magnification in the transport direction.

Further, in order to solve the above problems, the present invention provides image processing apparatuses of the following first and second mode.

(7) Image Processing Apparatus of First Mode

The present invention provides an image processing apparatus that creates prescribed image data from image information from an image reading apparatus including: a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and a reading timing adjustment section that adjusts the reading start time using a first mark on an adjustment sheet, which has the first mark formed at least at a downstream side edge in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and the image processing apparatus correcting an image position in the transport direction of the image data based on downstream side edge reading error correction information stored in advance.

According to the image processing apparatus of the first mode according to the present invention, since the downstream side edge reading error correction information (for example, a time and a distance that correspond to a reading error at the downstream side edge) is stored in advance, even though the original reading portion reads a position earlier than the actual downstream side edge position when reading the downstream side edge in the transport direction of the adjustment sheet, by correcting the image position in the transport direction of the image data based on the downstream side edge reading error correction information stored in advance, the image data can be created in a normal image position in the transport direction.

With the image processing apparatus of the first mode according to the present invention, in the case in which the adjustment sheet further has a second mark that is formed at least at an upstream side edge in the transport direction, and the image reading apparatus further includes a read magnification adjustment section that adjusts a read magnification in the transport direction set in advance using the first mark and the second mark on the adjustment sheet, the read magnification adjustment section adjusting the read magnification based on a read magnification adjustment time from when the original reading portion reads a position considered to be the downstream side edge in the transport direction in the first mark on the adjustment sheet until when the original reading portion reads a position considered to be the upstream side edge in the transport direction in the second mark on the adjustment sheet, the image processing apparatus can correct a magnification in the transport direction of the image data based on the downstream side edge reading error correction information.

According to this specific aspect, even though the original reading portion reads a position earlier than the actual downstream side edge position when reading the downstream side edge in the transport direction of the adjustment sheet, by correcting the magnification in the transport direction of the print image based on the downstream side edge reading error correction information stored in advance, the image data can be created at a normal magnification in the transport direction.

(8) Image Processing Apparatus of Second Mode

The present invention provides an image processing apparatus that creates prescribed image data from image information from an image reading apparatus including: a reading section that reads, in a prescribed original reading position using an original reading portion, image light from an original that is irradiated with light from a light source of the original reading portion while being transported in a prescribed transport direction at a prescribed transport speed by an original transport portion; and a read magnification adjustment section that adjusts a read magnification in the transport direction set in advance using a first mark and a second mark on an adjustment sheet that has the first mark formed at least at a downstream side edge in the transport direction, and the second mark formed at least at an upstream side edge in the transport direction, the read magnification adjustment section adjusting the read magnification based on a read magnification adjustment time from when the original reading portion reads a position considered to be a downstream side edge in the transport direction in the first mark on the adjustment sheet until when the original reading portion reads a position considered to be an upstream side edge in the transport direction in the second mark on the adjustment sheet, and the image processing apparatus correcting a magnification in the transport direction of the image data based on upstream side edge reading error correction information stored in advance.

According to the image processing apparatus of the second mode according to the present invention, since the upstream side edge reading error correction information (for example, a time and a distance that correspond to a reading error at the upstream side edge) is stored in advance, even though the original reading portion reads a position later than the actual upstream side edge position when reading the upstream side edge in the transport direction of the adjustment sheet, by correcting the magnification in the transport direction of the print image based on the upstream side edge reading error correction information stored in advance, the image data can be created at a normal magnification in the transport direction.

Note that in the present invention, it is possible to give a mode in which a reading member whose at least light irradiation surface is white or has half tone darkness, the reading member being read by the original reading portion when an original is not being transported, and provided to a side opposite a reading side of the original reading position with an original transport path therebetween as an example. In this case, as a darkness of the first mark and the second mark that are formed on the adjustment sheet, it is possible to give a darkness whose difference from the darkness of the light irradiation surface of the reading member can be recognized when the original reading portion performs reading, and is black or half tone darkness that is darker than the darkness of the light irradiation surface of the reading member, as an example. Here, the above "half tone darkness" is based on a concept including not only a gray half tone, but a color half tone.

In the present invention, the adjustment sheet may be a sheet printed by the image forming apparatus provided with the image reading apparatus.

In the present invention, irrespective of the types of image sensor provided to the original reading portion, it is possible to favorably obtain the operation effects described above. Examples of the original reading portion include an original reading portion including a contact-type image sensor, and an original reading portion including a reduction-type image sensor.

In the present invention, even in the case of reading original images on both of the front and back sides, it is possible to favorably obtain the operation effects described above. For example, the original reading portion may be provided on both sides with an original transport path therebetween.

As described above, according to the image reading apparatus of the first mode according to the present invention, and the image forming apparatus of the first mode provided with the same, since the downstream side edge (leading edge) reading error correction information is stored in advance, at the time of adjustment using the adjustment sheet using this downstream side edge reading error correction information, the downstream side edge in the transport direction of the adjustment sheet can be read with sufficient accuracy. Accordingly, when reading an original, it is possible to read an original image at an accurate reading start timing.

Further, according to the image reading apparatus of the second mode according to the present invention, and the image forming apparatus of the second mode provided with the same, since the upstream side edge (trailing edge) reading error correction information is stored in advance, at the time of adjustment using the adjustment sheet using this upstream side edge reading error correction information, the upstream side edge in the transport direction of the adjustment sheet can be read with sufficient accuracy. Accordingly, when reading an original, it is possible to read an original image at an accurate read magnification.

Further, according to the image forming apparatus of the third mode according to the present invention, since the downstream side edge reading error correction information is stored in advance, even though the original reading portion reads a position earlier than the actual downstream side edge position when reading the downstream side edge in the transport direction of the adjustment sheet using this downstream side edge reading error correction information, it is possible to print the print image on a recording sheet in a normal image position in the transport direction.

Further, according to the image forming apparatus of the fourth mode according to the present invention, since the upstream side edge reading error correction information is stored in advance, even though the original reading portion reads a position later than the actual upstream side edge position when reading the upstream side edge in the transport direction of the adjustment sheet using this upstream side edge reading error correction information, it is possible to print the print image on a recording sheet at a normal magnification in the transport direction.

Further, according to the image processing apparatus of the first mode according to the present invention, since the downstream side edge reading error correction information is stored in advance, even though the original reading portion reads a position earlier than the actual downstream side edge position when reading the downstream side edge in the transport direction of the adjustment sheet using this downstream side edge reading error correction information, it is possible to create the image data in a normal image position in the transport direction.

Further, according to the image processing apparatus of the second mode according to the present invention, since the upstream side edge reading error correction information is stored in advance, even though the original reading portion reads a position later than the actual upstream side edge position when reading the upstream side edge in the transport direction of the adjustment sheet using this upstream side edge reading error correction information, it is possible to create the image data at a normal magnification in the transport direction.

BRIEF DESCRIPTION OF THE DRAWINGS

FIGS. 2A to 2C show the schematic configuration of a control system of the image forming apparatus shown in FIG. 1. FIG. 2A is a control block diagram that mainly shows a main body control portion of the image forming apparatus provided with an image reading apparatus according to a first or second embodiment, FIG. 2B is a control block diagram that mainly shows a main body control portion of an image forming apparatus according to a third embodiment provided with an image reading apparatus, and FIG. 2C is a control block diagram that mainly shows a main body control portion of an image forming apparatus according to a fourth embodiment provided with an image reading apparatus.

FIG. 4A is a control block diagram that mainly shows a control portion of the image reading apparatus according to the first embodiment provided to the image forming apparatus, FIG. 4B is a control block diagram that mainly shows a control portion of the image reading apparatus according to the second embodiment provided to the image forming apparatus, and FIG. 4C is a control block diagram that mainly shows a control portion of the image reading apparatus provided to the image forming apparatus according to the third and forth embodiments.

FIG. 5 is a schematic side view that illustrates an adjustment state using an adjustment sheet in the image reading apparatus of the first embodiment.

FIG. 8A shows an example of a reading error that occurs when the leading edge of the adjustment sheet is read by an image sensor of an original reading portion including a light source that is disposed on the upstream side in the transport direction, taking an original reading position as a reference, in the image reading apparatus, and FIG. 8B shows an example of a reading error that occurs when the leading edge of the adjustment sheet is read by the image sensor of the original reading portion including a light source that is disposed on the downstream side in the transport direction, taking an original reading position as a reference, in the image reading apparatus.

DESCRIPTION OF PREFERRED
EMBODIMENTS

Hereinafter, a description is given regarding embodiments according to the present invention with reference to the drawings. Note that the embodiments below are example embodiments of the present invention, and are not intended to limit the technical scope of the present invention.

Figure 1:
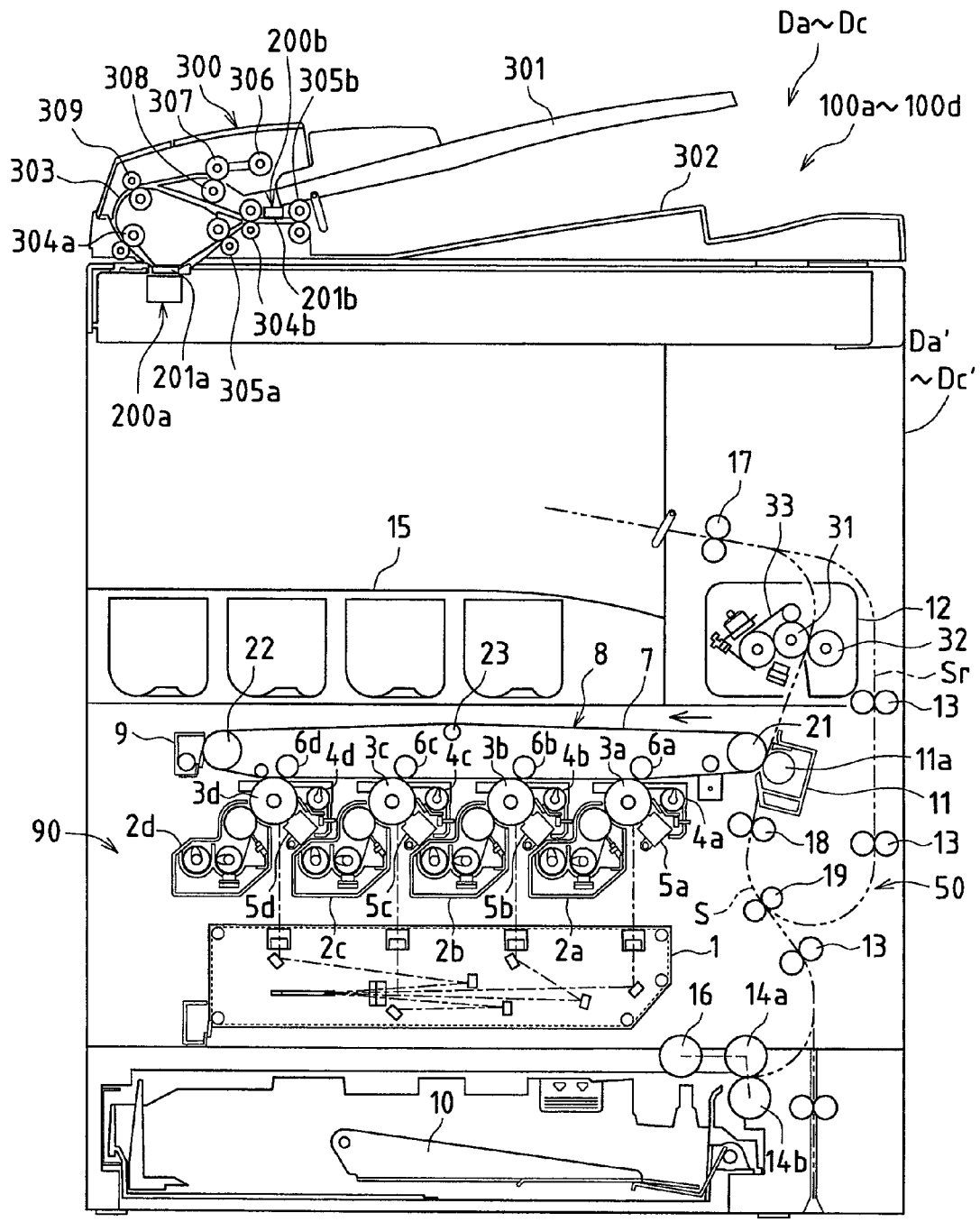
FIG. 1 is a schematic side view showing an image forming apparatus provided with an image reading apparatus.

FIG. 1 is a schematic side view showing image forming apparatuses Da to Dc provided with image reading apparatuses 100a to 100d.

The image forming apparatuses Da to Dc shown in FIG. 1 are provided with the image reading apparatuses 100a to 100d, which read an image on an original G (see FIG. 3 described later, for instance), and apparatus main bodies Da' to Dc' that record and form an image on the original G read by these image reading apparatuses 100a to 100d or an image received from outside, in color or in monochrome on a recording sheet such as plain paper. Note that the image forming apparatuses Db and Dc also function as image processing apparatuses that create prescribed image data based on image information from the image reading apparatuses 100c and 100d.

[Overall Configuration of Image Forming Apparatus]

Each of the apparatus main bodies Da' to Dc' of the respective image forming apparatuses Da to Dc is provided with an exposing apparatus 1, development apparatuses 2 (2a, 2b, 2c, 2d), photosensitive drums 3 (3a, 3b, 3c, 3d) that operate as image carriers, charging units 5 (5a, 5b, 5c, 5d), cleaner apparatuses 4 (4a, 4b, 4c, 4d), an intermediate transfer belt apparatus 8 including intermediate transfer rollers 6 (6a, 6b, 6c, 6d) that operates as a transfer portion, a fixing apparatus 12, a sheet transport apparatus 50, a paper feed tray 10 that operates as a paper feed portion, and a discharge tray 15 that operates as a discharge portion.

Image data handled in the apparatus main bodies Da' to Dc' of the image forming apparatuses Da to Dc corresponds to a color image using each of the colors black (K), cyan (C), magenta (M), and yellow (Y), or corresponds to a monochrome image using a single color (for example, black). Accordingly, four units of each of the development apparatuses 2 (2a, 2b, 2c, 2d), the photosensitive drums 3 (3a, 3b, 3c, 3d), the charging units 5 (5a, 5b, 5c, 5d), the cleaner apparatuses 4 (4a, 4b, 4c, 4d), and the intermediate transfer rollers 6 (6a, 6b, 6c, 6d) are provided in order to form four types of images corresponding to the respective colors, thus configuring four image stations. Among suffix signs a to d of the reference numerals, suffix sign a corresponds to black, suffix sign b corresponds to cyan, suffix sign c corresponds to magenta, and suffix sign d corresponds to yellow. Hereinafter, a description is given with suffix signs a to d being omitted.

The photosensitive drums 3 are disposed substantially in the center in the vertical direction of the apparatus main bodies Da' to Dc'. The charging unit 5 is a charging means that uniformly charges the surface of the photosensitive drum 3 to a predetermined electric potential. Other than a contact-roller-type charging unit or a contact-brush-type charging unit, a charging-type charging unit is used for the charging unit 5.

The exposing apparatus 1 is a laser scanning unit (LSU) provided with a laser diode and a reflection mirror, and exposes the surface of the charged photosensitive drum 3 according to image data, thus forming an electrostatic latent image on the surface of the charged photosensitive drum 3 according to the image data.

The development apparatuses 2 develop electrostatic latent images formed on the photosensitive drums 3 using a toner (K, C, M, Y). The cleaner apparatuses 4 remove and collect residual toner on the surfaces of the photosensitive drums 3 after developing and transferring images.

The intermediate transfer belt apparatus 8 disposed above the photosensitive drums 3 is provided with an intermediate transfer belt 7, an intermediate transfer belt drive roller 21, an idler roller 22, a tension roller 23, and an intermediate transfer belt cleaning apparatus 9, in addition to the intermediate transfer rollers 6.

The intermediate transfer belt 7 is stretched across and supported by roller members, such as the intermediate transfer belt drive roller 21, the intermediate transfer rollers 6, the idler roller 22, and the tension roller 23, which allow the intermediate transfer belt 7 to revolve in a prescribed sheet transport direction (the direction of the arrow in FIG. 1).

The intermediate transfer rollers 6 are rotatably supported inside the intermediate transfer belt 7, and pressed against the photosensitive drums 3 via the intermediate transfer belt 7.

The intermediate transfer belt 7 is provided so as to be in contact with the photosensitive drums 3. Toner images on the surface of the photosensitive drums 3 are superimposed and transferred sequentially onto the intermediate transfer belt 7, so as to form a color toner image (a toner image of each color). Here, this intermediate transfer belt 7 is formed as an endless belt, using a film having a thickness of approximately 100 μm to 150 μm.

A toner image is transferred from the photosensitive drums 3 to the intermediate transfer belt 7 by the intermediate transfer rollers 6, which are pressed against the inner side (back surface) of the intermediate transfer belt 7. In order to transfer the toner images, a high voltage transfer bias (high voltage with opposite polarity (+) as the charge polarity (−) of the toner, for example) is applied to the intermediate transfer rollers 6. The intermediate transfer rollers 6 use a metal (stainless steel, for example) shaft with a diameter of 8 to 10 mm as a base, and the surface of this shaft is covered with conductive elastic material (such as EPDM or urethane foam, for example). With this conductive elastic material, it is possible to uniformly apply a high voltage to a recording sheet.

Each apparatus main body Da' to Dc' of the image forming apparatuses Da to Dc is further provided with a secondary transfer apparatus 11 including a transfer roller 11a that operates as a transfer portion. The transfer roller 11a is in contact with the intermediate transfer belt 7 on the opposite side (outer side) as the intermediate transfer belt driving roller 21.

The toner images on the surface of the photosensitive drums 3 are layered on the intermediate transfer belt 7 as described above and become a color toner image indicated by image data. The toner images of each color layered in this way are transported together with the intermediate transfer belt 7, and transferred to the recording sheet by the secondary transfer apparatus 11.

The intermediate transfer belt 7 and the transfer roller 11a of the secondary transfer apparatus 11 are pressed against each other so as to form a nip region. Further, a voltage (high voltage with opposite polarity (+) as the charge polarity (−) of the toner, for example) for transferring toner images of each color on the intermediate transfer belt 7 to a recording sheet is applied to the transfer roller 11a of the secondary transfer apparatus 11. Furthermore, in order to constantly obtain the nip region, either one of the transfer roller 11a of the secondary transfer apparatus 11 or the intermediate transfer belt drive roller 21 is made of a hard material (metal or the like), and the other roller is made of a soft material, such as an elastic roller (elastic rubber roller, foam resin roller, or the like).

Further, in some cases, the secondary transfer apparatus 11 may not completely transfer a toner image on the intermediate transfer belt 7 to a recording sheet, thus leaving toner on the intermediate transfer belt 7, and the residual toner causes toner color mixing to occur in the following step. For this reason, the intermediate transfer belt cleaning apparatus 9 removes and collects residual toner. The intermediate transfer belt cleaning apparatus 9 is provided with, for example, a cleaning blade that is in contact with the intermediate transfer belt 7 as a cleaning member, and residual toner can be removed and collected by this cleaning blade. The idler roller 22 supports the intermediate transfer belt 7 from the inner side (back side), and the cleaning blade is in contact with the intermediate transfer belt 7 so as to apply pressure to the idler roller 22 from outside.

The paper feed tray 10 is a tray for storing recording sheets, and is provided in the lower part of an image forming portion 90 of each of the apparatus main bodies Da' to Dc'. Also, the discharge tray 15 provided in the upper part of the image forming portion 90 is a tray on which a printed recording sheet is placed facedown.

Further, each of the apparatus main bodies Da' to Dc' is provided with the sheet transport apparatus 50 for feeding a recording sheet on the paper feed tray 10 to the discharge tray 15 via the secondary transfer apparatus 11 and the fixing apparatus 12. This sheet transport apparatus 50 has an S-shaped sheet transport path S, and transport members, such as a pickup roller 16, a paper feed roller 14a, a separation roller 14b, transport rollers 13, a pair of pre-registration rollers 19, a pair of registration rollers 18, the fixing apparatus 12, and discharge rollers 17, are disposed along the sheet transport path S.

The pickup roller 16 is a draw-in roller that is provided at an edge portion on a downstream side in the sheet transport direction of the paper feed tray 10, and supplies recording sheets one by one from the paper feed tray 10 to the sheet transport path S. The paper feed roller 14a transports recording sheets to the sheet transport path S while causing the recording sheets to pass between the paper feed roller 14a and the separation roller 14b so as to separate them one-by-one. The transport rollers 13 and the pair of pre-registration rollers 19 are small rollers for promoting and assisting transportation of recording sheets. The transport rollers 13 are provided in a plurality of positions along the sheet transport path S. The pair of pre-registration rollers 19 is provided closest on the upstream side in the sheet transport direction to the pair of registration rollers 18, and transports a recording sheet to the pair of registration rollers 18.

The fixing apparatus 12 receives a recording sheet on which a toner image has been transferred, sandwiches the recording sheet between a heat roller 31 and a pressure roller 32, and transports the recording sheet.

The temperature of the heat roller 31 is controlled so as to be a prescribed fixing temperature. The heat roller 31 has a function for melting, mixing, and pressing the toner image that has been transferred to the recording sheet so as to thermally fix the toner image onto the recording sheet by subjecting the recording sheet to thermocompression bonding in cooperation with the pressure roller 32. Further, the fixing apparatus 12 is provided with an external heating belt 33 for heating the heat roller 31 from outside.

The recording sheet on which toner images of each color have been fixed is discharged on the discharge tray 15 by the discharge rollers 17. Note that it is also possible to form a monochrome image using at least one of the four image forming stations, and transfer the monochrome image to the intermediate transfer belt 7 of the intermediate transfer belt apparatus 8. Similar to a color image, such a monochrome image is also transferred to a recording sheet from the intermediate transfer belt 7, and fixed on the recording sheet.

Further, when image formation is performed on not only the front face of the recording sheet, but both faces, after an image on the front face of the recording sheet has been fixed by the fixing apparatus 12, the discharge rollers 17 are stopped and then rotated in reverse while transporting the recording sheet by the discharge rollers 17 on the sheet transport path 5, thereby causing the recording sheet to pass through a front-back reverse path Sr. After the front and back of the recording paper are reversed, the recording sheet is again led to the pair of registration rollers 18. Similar to the case of performing image formation on the front face of the recording sheet, an image is recorded and fixed on the back face of the recording sheet, and the recording sheet is discharged onto the discharge tray 15.

The apparatus main bodies Da' to Dc' are further provided with main body control portions 600a to 600c, respectively. FIGS. 2A to 2C show the schematic configuration of the control system of the image forming apparatuses Da to Dc shown in FIG. 1. FIG. 2A is a control block diagram that mainly shows the main body control portion 600a in the image forming apparatus Da provided with the image reading apparatus 100a or 100b according to a first or a second embodiment, in one drawing. FIG. 2B is a control block diagram that mainly shows the main body control portion 600b of the image forming apparatus Db according to a third embodiment provided with the image reading apparatus 100c. Further, FIG. 2C is a control block diagram that mainly shows the main body control portion 600c in the image forming apparatus Dc according to a fourth embodiment provided with the image reading apparatus 100d.

The main body control portion 600a is connected to first and second original reading portions 200a and 200b of the image reading apparatuses 100a and 100b, and the image forming portion 90 of the image forming apparatus main body Da'. The main body control portion 600b is connected to the first and second original reading portions 200a and 200b of the image reading apparatus 100c, and the image forming portion 90 of the image forming apparatus main body Db'. The main body control portion 600c is connected to the first and second original reading portions 200a and 200b of the image reading apparatus 100d, and the image forming portion 90 of the image forming apparatus main body Dc'. Further, the main body control portions 600a to 600c are connected to actuators such as motors that drive rollers in the image forming apparatus main bodies Da' to Dc', sensors such as detection switches, main body operation panel portions, and the like.

As shown in FIGS. 2A to 2C, the main body control portions 600a to 600c are constituted from a microcomputer including a processing portion 610 such as a CPU, and storage portions 620a to 620c including memories such as a ROM and a RAM. Specifically, the image forming apparatuses Da to Dc control various constituent elements by the processing portion 610 of the main body control portions 600a to 600c loading a control program stored in the ROM of the storage portions 620a to 620c in advance in the RAM of the storage portions 620a to 620c, and executing the program.

[Overall Configuration of Image Reading Apparatus]

Figure 3:
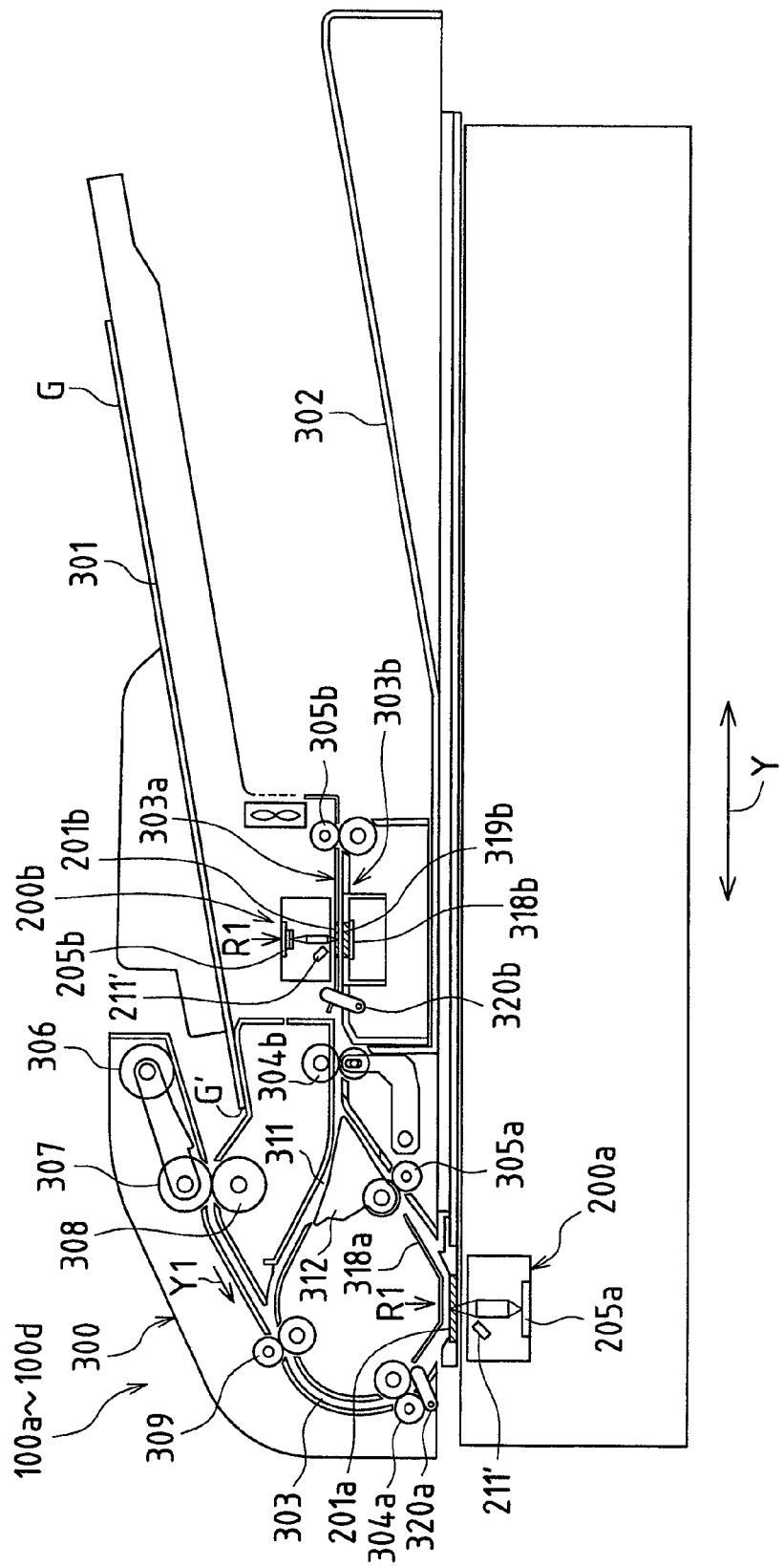
FIG. 3 schematically shows a longitudinal cross-section of the image reading apparatus shown in FIG. 1.

FIG. 3 schematically shows a longitudinal cross-section of the image reading apparatuses 100a to 100d shown in FIG. 1. Note that FIG. 3 shows a case in which a light source 211' is disposed on the upstream side in a transport direction Y1 of the original G, taking a prescribed original reading position R1 as a reference.

The image reading apparatuses 100a to 100d shown in FIGS. 1 and 3 are configured to read an original image by moving the original G using a moving original method.

Specifically, the image reading apparatuses 100a to 100d are provided with an original transport portion 300 that transports the original G at a prescribed transport speed V in the prescribed transport direction Y1, and the first and second original reading portions 200a and 200b that are provided on both sides with an original transport path 303 therebetween. Note that a configuration may be adopted in which only either one of the first and second original reading portions 200a and 200b is provided as an original reading portion.

The first and second original reading portions 200a and 200b respectively have the light source 211' and a light source 211" (see FIG. 6 for the light source 211"), and first and second image sensors 205a and 205b that read the original G transported by the original transport portion 300 in the prescribed original reading position R1. Furthermore, the first and second original reading portions 200a and 200b respectively have first and second original reading glasses 201a and 201b.

Specifically, the first and second original reading portions 200a and 200b illuminate, with the light sources 211' and 211" via the original reading glasses 201a and 201b, the original G transported to one side Y1 in a sub-scanning direction Y so as to pass above the first and second original reading glasses 201a and 201b in the original transport portion 300, and at the same time, scan reflected light (original image light) from the original G illuminated by the light sources 211' and 211" in a scanning direction X (see the direction of the arrow X in FIG. 7 described later), so as to read an original image with the first and second image sensors 205a and 205b.

The light sources 211' and 211" irradiate the original G transported by the original transport portion 300 with light. The first and second image sensors 205a and 205b convert reflected light from the original G into an electric signal as image data.

The original transport portion 300 is provided with an original tray 301 on which the originals G are placed for being transported, a discharge tray 302 disposed under this original tray 301, an original transport path 303 that connects between these trays, a pair of first upstream side transport rollers 304a, a pair of second upstream side transport rollers 304b, a pair of first downstream side transport rollers 305a, and a pair of second downstream side transport rollers 305b.

The original transport path 303 is formed with an inner transport guide 303a and an outer transport guide 303b. The pair of first upstream side transport rollers 304a, and the pair of second upstream side transport rollers 304b transport recording sheets on the upstream side in the transport direction Y1, taking the original reading position R1 as a reference. Further, the pair of first downstream side transport rollers 305a, and the pair of second downstream side transport rollers 305b transport recording sheets on the downstream side in the transport direction Y1, taking the original reading position R1 as a reference. The first and second original reading glasses 201a and 201b are respectively provided in a substantially horizontal manner so as to demarcate transport walls of the outer transport guide 303b and the inner transport guide 303a.

The original transport portion 300 is further provided with a pickup roller 306, an original paper feed roller 307, and a separation member (here, a separation roller) 308.

The pickup roller 306 feeds the original G placed on the original tray 301 into the original transport path 303 from the original tray 301 along the transport direction Y1. The original paper feed roller 307 is disposed on the downstream side in the transport direction Y1 relative to the pickup roller 306, and transports the original G fed by the pickup roller 306 further to the downstream side in the transport direction Y1 while sandwiching the original G in cooperation with the separation member 308. Arranged in opposition to the original paper feed roller 307, the separation member 308 sorts (separates) the originals G so that one original G is transported between the separation member 308 and the original paper feed rollers 307.

In the original transport portion 300 provided with such a configuration, the originals G are transported by the pickup roller 306 between the original paper feed roller 307 and the separation member 308 where the originals G are sorted and separated, and then transported one-by-one by rotationally driving the original paper feed roller 307. Then, it is possible to supply the originals G transported by the original paper feed roller 307 one-by-one to the pair of first upstream side transport rollers 304a by guiding the originals G to the original transport path 303.

Specifically, with a pickup roller driving portion (not shown), the pickup roller 306 can be brought into and out of contact with the originals G loaded on the original tray 301. Further, the pickup roller 306 is coupled to the original paper feed roller 307 via a drive transmission means (not shown) including an endless belt or the like so as to rotate in the same direction as the original paper feed roller 307. When there is a request to read an original G, the pickup roller 306 and the original paper feed roller 307 are rotationally driven in the direction that transports the original G in the transport direction Y1 by an original supply driving portion (not shown).

The original transport path 303 is formed in a loop shape such that the originals G are transported from the original paper feed roller 307, via a pair of registration rollers 309, the pair of first upstream side transport rollers 304a, the first original reading portion 200a, and the pair of first downstream side transport rollers 305a, furthermore, to the pair of second upstream side transport rollers 304b, the second original reading portion 200b, and the pair of second downstream side transport rollers 305b, and thereafter, discharged to the discharge tray 302.

In the present embodiment, a configuration is adopted in which the first original reading portion 200a or the second original reading portion 200b can read the surface of one side or the surface of the other side of the original G during one original transportation, and also both of the first and second original reading portions 200a and 200b can read both of the surface of one side and the surface of the other side of the original G (both sides) during one original transportation. Note that a configuration may be adopted in which the second original reading portion 200b is eliminated, and the first original reading portion 200a reads the surface of one side of the original G, and thereafter using a reverse transport path 311 and a reverse gate 312, the original G is reversed so that the front and back of the original G are reversed, and then, the first original reading portion 200a again reads the surface of the other side of the original G.

Further, the pair of registration rollers 309 that is disposed on a downstream side in the transport direction Y1 relative to the original paper feed roller 307 and on an upstream side in the transport direction Y1 relative to the pair of first upstream side transport rollers 304a is configured to contact against and align, in a paused state, the downstream side edge in the transport direction Y1 (hereinafter, referred to as a leading edge) of the original G that has been transported by the original paper feed roller 307, and then to be rotationally driven in coordination with the transport timing.

Further, in the present embodiment, the original transport path 303 is provided with a first original detecting portion 320a that detects the original G on the upstream side in the transport direction Y1, taking the original reading position R1 of the first original reading portion 200a as a reference. Here, the first original detecting portion 320a is disposed on a downstream side relative to the pair of first upstream side transport rollers 304a, and on an upstream side relative to the original reading position R1 of the first original reading portion 200a in the transport direction Y1.

Further, in the present embodiment, the original transport path 303 is provided with a second original detecting portion 320b that detects the original G on the upstream side in the transport direction Y1, taking the original reading position R1 of the second original reading portion 200b as a reference. Here, the second original detecting portion 320b is disposed on a downstream side relative to the pair of second upstream side transport rollers 304b, and on an upstream side relative to the original reading position R1 of the second original reading portion 200b in the transport direction Y1. Here, it is assumed that the first and second original detecting portions 320a and 320b are original detecting sensors, such as lever-type switches or photosensors.

Also, in the present embodiment, the first and second original reading portions 200a and 200b are further provided with first and second reading members (here, white plates) 318a and 318b, respectively, that are disposed opposite the reading sides of the original reading positions R1 with the first and second original reading glasses 201a and 201b therebetween. These white plates 318a and 318b are read by the original reading portions 200a and 200b when an original is not being transported. Also, in the present embodiment, the second original reading portion 200b is further provided with a reading member glass 319b that is disposed on the original transporting side of the second white plate 318b.

In the image reading apparatuses 100a to 100d described above, if an instruction to read images on both sides of the original G is given, the original G is transported by the original transport portion 300 to one side Y1 in the sub-scanning direction Y towards the first original reading portion 200a. Specifically, the originals G placed in the original tray 301 are taken out by the pickup roller 306, separated one-by-one by the original paper feed roller 307 and the separation member 308, and transported to the original transport path 303. A leading edge G' of the original G transported to the original transport path 303 is aligned in order to prevent skew by the pair of registration rollers 309, and the original G is fed at a prescribed transport timing. The transport timing of the original G is detected by the first original detection sensor 320a, and thereafter, the original G is transported by the pair of first upstream side transport rollers 304a to the first original reading portion 200a.

Then, the surface of one side of the original G that passed above the first original reading glass 201a is irradiated with light from the light sources 211' and 211" (see FIG. 6 for the light source 211") via the first original reading glass 201a, and the light is reflected on the surface of the one side. The light reflected from the surface of the one side of the original G enters the first image sensor 205a, where an original image is read and converted into electrical image data.

The original G whose surface of one side has been read is pulled out from the first original reading glass 201a by the pair of first downstream side transport rollers 305a, and transported to the second original reading portion 200b by the pair of second upstream side transport rollers 304b. At this time, the transport timing of the original G is detected by the second original detection sensor 320b.

Then, the surface of another side of the original G that passed above the second original reading glass 201b is irradiated with light from the light sources 211' and 211" via the second original reading glass 201b, and the light is reflected on the surface of the other side. The light reflected on the surface of the other side of the original G enters the second image sensor 205b, where an original image is read and converted into electrical image data.

The original G whose both sides have been read is pulled out from the second original reading glass 201b by the pair of second downstream side transport rollers 305b, and is discharged onto the discharge tray 302.

Note that although reading of both sides of the original G is described here, in the case in which only the surface of one side of the original G is read, reading processing performed by the second original reading portion 200b can be stopped when performing the above-described reading processing, and in the case in which only the surface of the other side of the original G is read, reading processing performed by the first original reading portion 200a can be stopped when performing the above-described reading processing.

Further, the second original detecting portion 320b may be eliminated by the first original detecting portion 320a also serving as the second original detecting portion 320b. Further, at least one of the first original detecting portion 320a and the second original detecting portion 320b may be eliminated by detecting the transport timing based on the rotation timing of the pair of registration rollers 309.

DESCRIPTION OF DISTINGUISHING FEATURES OF THE PRESENT INVENTION

Figure 4A:
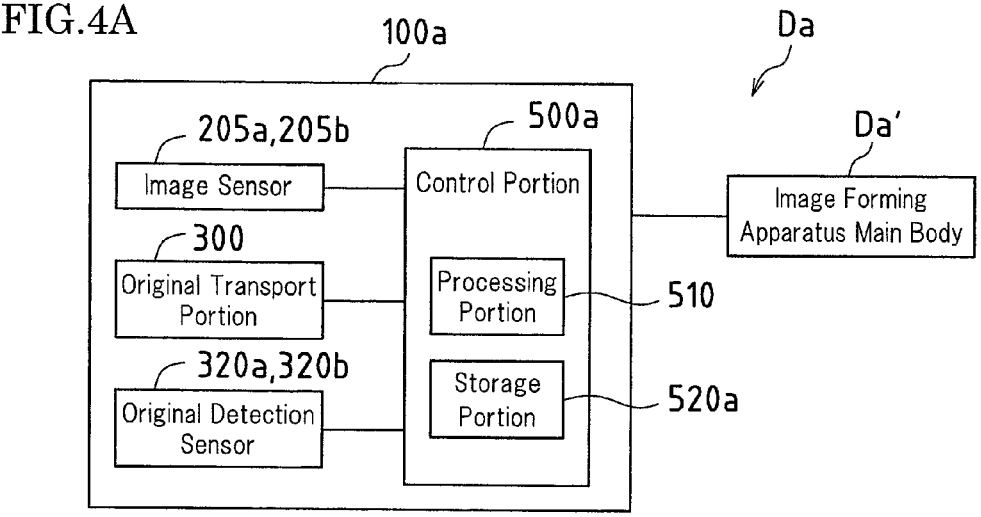
FIGS. 4A to 4C show the schematic configuration of a control system of the image reading apparatus shown in FIGS. 1 and 3.
Figure 4B:
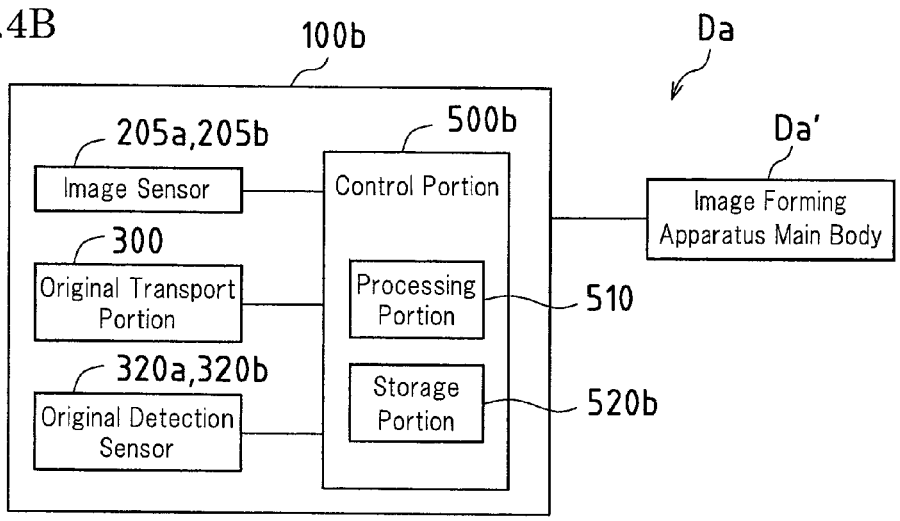
Figure 4C:
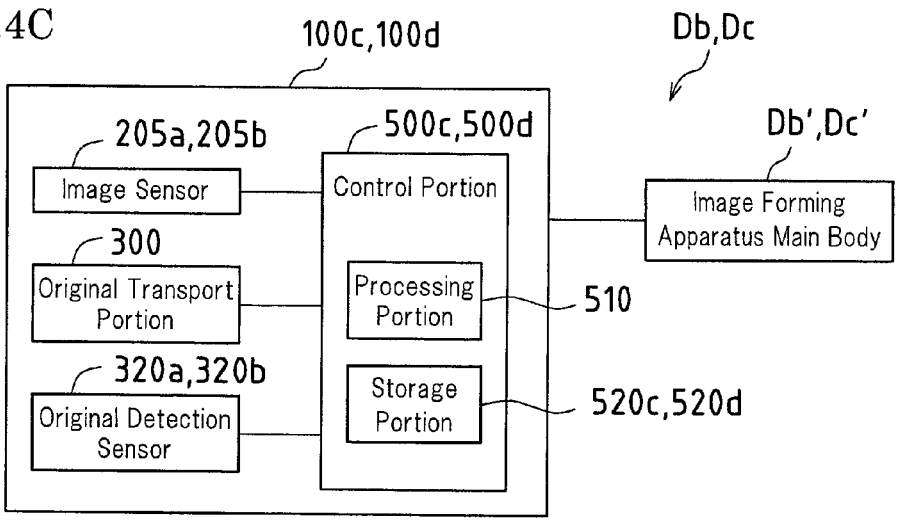

The image reading apparatuses 100a to 100d shown in FIGS. 1 and 3 are further respectively provided with control portions 500a to 500d. FIGS. 4A to 4C show the schematic configuration of the control system of the image reading apparatuses 100a to 100d shown in FIGS. 1 and 3. FIG. 4A is a control block diagram that mainly shows the control portion 500a in the image reading apparatus 100a according to the first embodiment provided to the image forming apparatus Da. FIG. 4B is a control block diagram that mainly shows the control portion 500b in the image reading apparatus 100b according to the second embodiment provided to the image forming apparatus Da. Further, FIG. 4C is a control block diagram that mainly shows the control portions 500c and 500d of the image reading apparatuses 100c and 100d provided to the image forming apparatuses Db and Dc according to the third and fourth embodiments, in one drawing.

The control portions 500a to 500d are electrically connected to the image sensors 205a and 205b of the original reading portions 200a and 200b, the original transport portion 300, and the original detection sensors 320a and 320b. Further, the control portions 500a to 500d are connected to actuators such as motors that drive rollers, sensors such as detection switches, operation panel portions, and the like.

As shown in FIGS. 4A to 4C, the control portions 500a to 500d are constituted from a microcomputer including a processing portion 510 such as a CPU, and storage portions 520a to 520d including memories such as a ROM and a RAM. Specifically, these image forming apparatuses 100a to 100d control various constituent elements by the processing portion 510 of the control portions 500a to 500d loading a control program stored in the ROM of the storage portions 520a to 520d in advance in the RAM of the storage portions 520a to 520d, and executing the program.

(First Embodiment)

The image reading apparatus 100a according to the first embodiment of the present invention is configured such that the reading start timing of the original G is adjusted using an adjustment sheet P that has a first mark Q1 (here, a rectangular shaped black mark) formed so as to include at least a leading edge P'. Note that here, the adjustment sheet P is a sheet obtained by the image forming portion 90 printing using image data on a printing pattern of the adjustment sheet P that the image forming apparatus Da provided with the image reading apparatus 100a has stored in advance in the storage portion 620a. This is the same in the second to fourth embodiments described later.

FIG. 5 is a schematic side view that illustrates an adjustment state using the adjustment sheet P in the image reading apparatus 100a of the first embodiment.

In the first embodiment, the light source 211' is disposed on the upstream side in the transport direction Y1, taking the original reading position R1 as a reference. Here, the image sensors 205a and 205b are contact-type image sensors such as CISs (contact image sensors). Note that reduction-type image sensors, such as CCDs (charge coupled devices), may be used for the image sensors.

The original detection sensors 320a and 320b detect the transport timing (here, leading edge timing) of the original G and the adjustment sheet P on the upstream side in the transport direction Y1 relative to the original reading position R1. Here, the original detection sensors 320a and 320b sense the leading edge G' of the original G, and the leading edge P' of the adjustment sheet P that are transported by the original transport portion 300 in a prescribed original detection position R2 that is on the upstream side in the transport direction Y1 relative to the original reading position R1.

Figure 7:
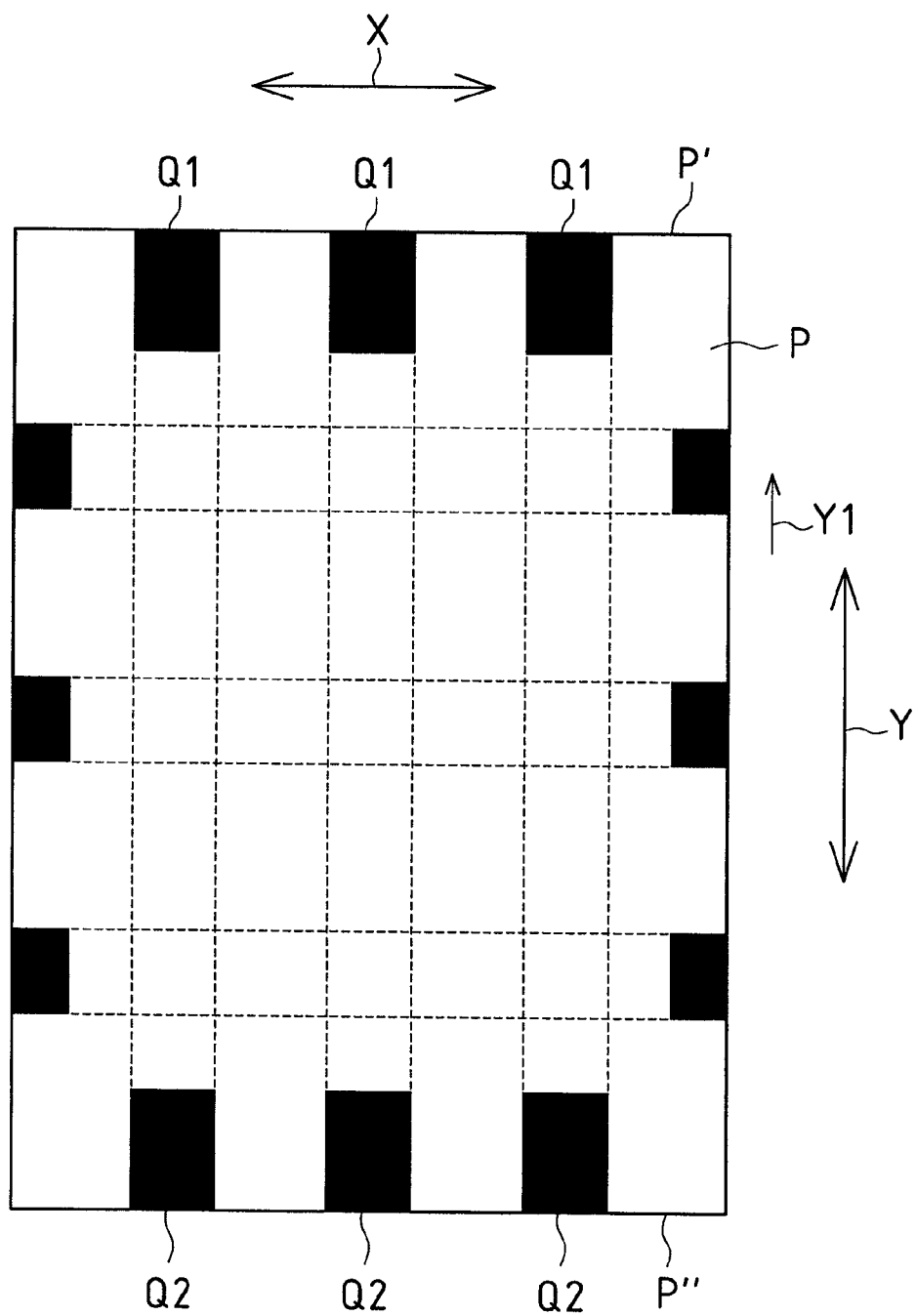
FIG. 7 is a plan view showing the adjustment sheet that can be used for the image reading apparatus shown in FIGS. 1 and 3.
Figure 8A:
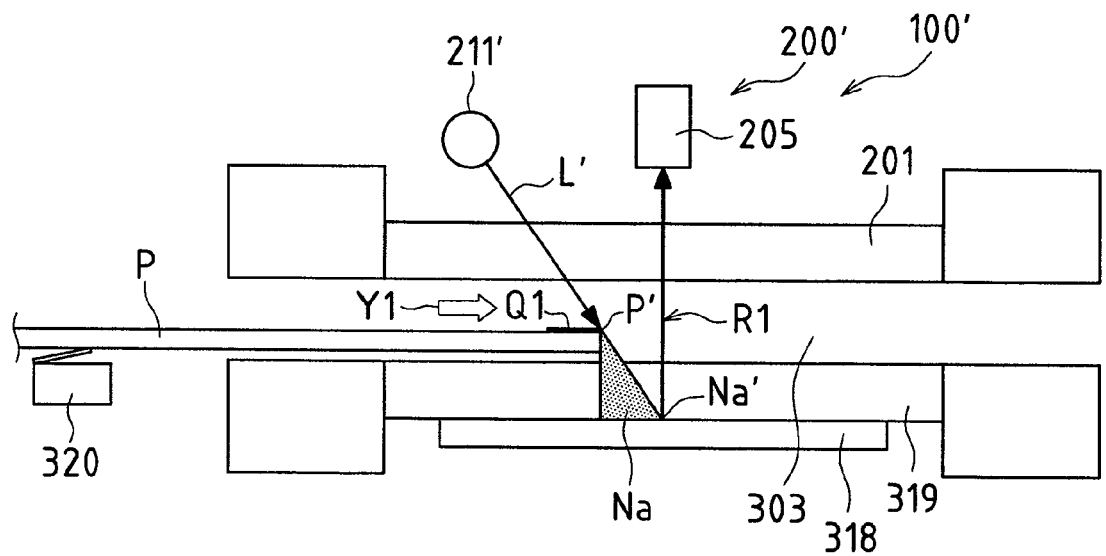
FIGS. 8A and 8B are schematic side views that illustrate a reading error in an image reading apparatus using a moving original method.
Figure 8B:
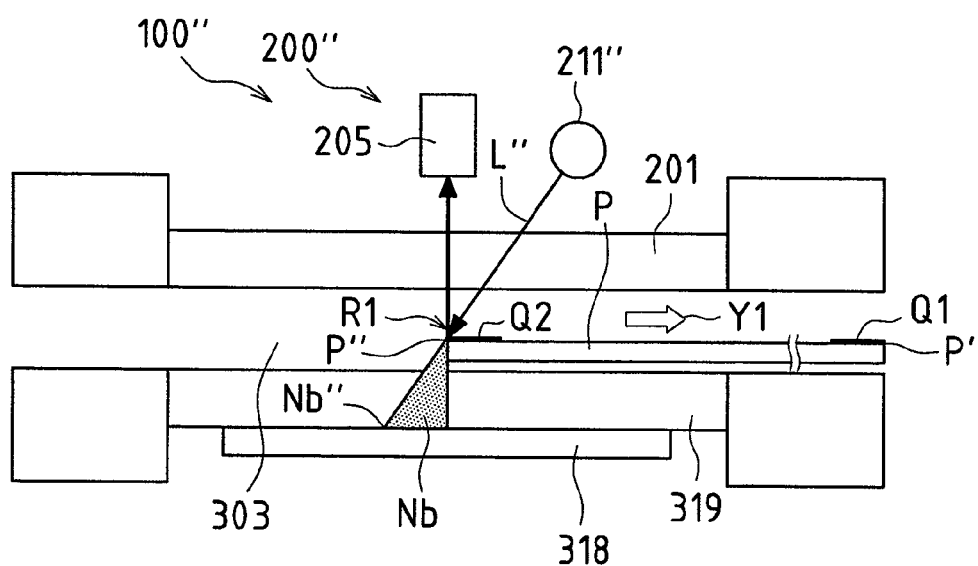
Figure 9:
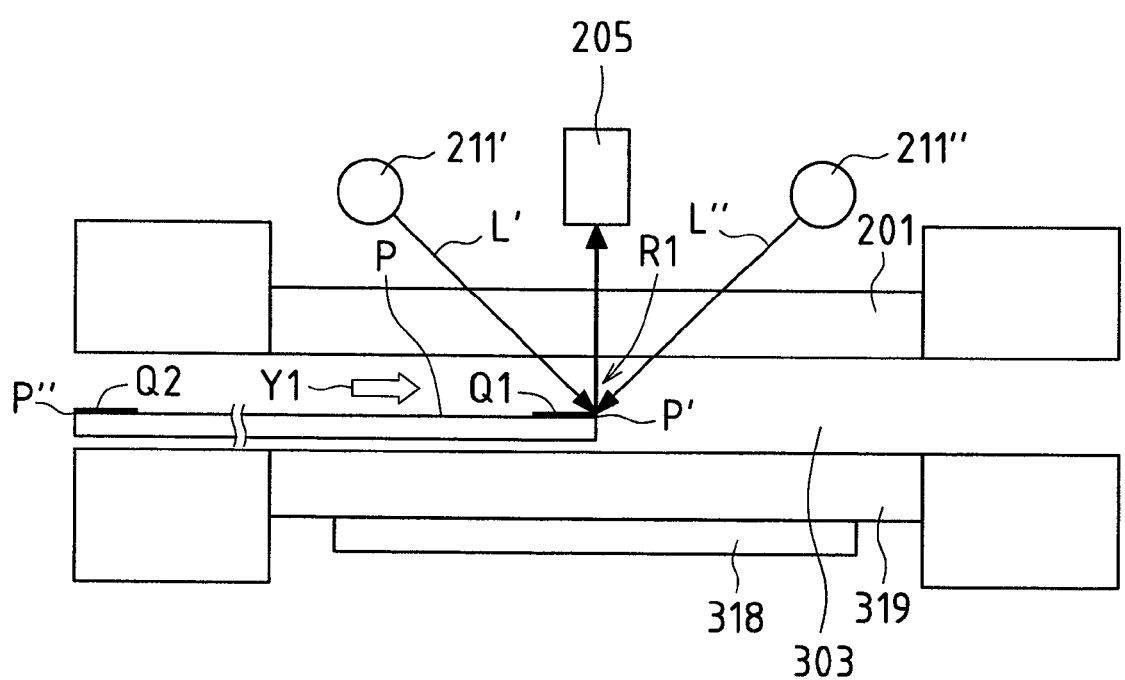
FIG. 9 is a schematic side view that shows a state in which light sources are respectively disposed on the upstream side and the downstream side in the transport direction, taking the original reading position as a reference.

FIG. 7 is a plan view showing the adjustment sheet P on which the first marks Q1 are formed in positions including the leading edge P'. Note that the adjustment sheet P shown in FIG. 7 can also be used in the second to fourth embodiments described later. In addition, second marks Q2 (here, rectangular-shaped black marks) are further formed on the adjustment sheet P shown in FIG. 7, so as to include at least an upstream side edge (hereinafter, a trailing edge) P''' in the transport direction Y1. Further, on the adjustment sheet P shown in FIG. 7, in order to enable transport in the direction orthogonal to the transport direction Y1, marks are also formed in the direction orthogonal to the transport direction Y1.

Specifically, one or two or more (here, three) first marks Q1 are formed on the adjustment sheet P along the direction X orthogonal to the transport direction Y1.

The control portion 500a shown in FIG. 4A is configured to function as a means that includes a reading means M1a and a reading timing adjustment means M2a.

The reading means M1a reads using the image sensors 205a and 205b of the original reading portions 200a and 200b in the original reading position R1, image light from the original G that is irradiated with light from the light sources 211' of the original reading portions 200a and 200b while being transported in the transport direction Y1 at the transport speed V by the original transport portion 300.

Specifically, the reading means M1a starts reading an original image after a reading start time Ta set in advance elapses after the original detection sensors 320a and 320b detect the transport timing of the original G (here, the leading edge G') on the upstream side in the transport direction Y1, taking the original reading position R1 as a reference.

The reading timing adjustment means M2a adjusts the reading start time Ta using the first mark Q1 on the adjustment sheet P.

Specifically, the reading timing adjustment means M2a adjusts the reading start time Ta based on a reading timing adjustment time T1a from when the original detection sensors 320a and 320b detect the leading edge P' of the adjustment sheet P transported in the transport direction Y1 at the transport speed V by the original transport portion 300 on the upstream side in the transport direction Y1, taking the original reading position R1 as a reference, until when the image sensors 205a and 205b of the original reading portions 200a and 200b read a position considered to be the leading edge P' in the first mark Q1 on the adjustment sheet P.

Specifically, the reading timing adjustment means M2a uses a time obtained by averaging each time from when the original detection sensors 320a and 320b detect the leading edge P' of the adjustment sheet P until when the image sensors 205a and 205b of the original reading portions 200a and 200b read two or more positions considered to be the leading edge P' that correspond to the first marks Q1 on the adjustment sheet P, as the reading timing adjustment time T1a.

Leading edge reading error correction information is stored in advance in the storage portion 520a. Here, this leading edge reading error correction information is assumed to indicate a leading edge reading error correction time T2a corresponding to a reading error (specifically, shadow Na) at the leading edge P'. The control portion 500a corrects the reading start timing of the original G based on the leading edge reading error correction time T2a.

In the first embodiment, the leading edge reading error correction time T2a stored in advance is a time obtained by dividing a width Ha in the transport direction Y1 of the shadow Na formed at the leading edge P' of the adjustment sheet P due to light L' from the light source 211' by the transport speed V.

The width Ha in the transport direction Y1 of the shadow Na may be obtained by actually measuring the printed image, or may be calculated from an incident angle θa of the light L' from the light source 211' that emits light from the upstream side onto the adjustment sheet P transported in the transport direction Y1, and a distance d between the light irradiation surface of the adjustment sheet P and the light irradiation surfaces of the white plates 318a and 318b, using the following equation (1).

$$Ha = d \tan \theta a \qquad \text{Equation (1)}$$

The reading timing adjustment means M2a adjusts the reading start time Ta based on a reading timing correction adjustment time T3a obtained by adding the leading edge reading error correction time T2a to the reading timing adjustment time T1a. Here, the reading start time Ta is a time from when the original detection sensors 320a and 320b detect the leading edge P' in the first mark Q1 on the adjustment sheet P until when the image sensors 205 of the original reading portions 200a and 200b read a position that is considered to be the leading edge P' in the first mark Q1 on the adjustment sheet P. In this case, the reading timing correction adjustment time T3a can be used as the reading start time Ta. According to the image reading apparatus 100a of the first embodiment and the image forming apparatus Da provided with the same, since the leading edge reading error correction time T2a is stored in the storage portion 520a in advance, even though the original reading portions 200a and 200b read a position earlier than the actual leading edge position due to the shadow Na when reading the leading edge P' of the adjustment sheet P, based on the reading timing correction adjustment time T3a obtained by adding the leading edge reading error correction time T2a stored in advance to the reading timing adjustment time T1a, the reading start timing of the original G is corrected using the reading timing correction adjustment time T3a as the reading start time Ta; accordingly, the reading timing correction adjustment time T3a can be corrected to an accurate value. Therefore, the reading start time Ta can be corrected to an accurate value; accordingly, it is possible to read an original image at an accurate reading start timing when reading the original G.

In addition, the reading start timing can be corrected using a comparatively simple control configuration such as that obtained by adding the leading edge reading error correction time T2a to the reading timing adjustment time T1a.

Furthermore, since the reading timing adjustment means M2a uses a time obtained by averaging each time from when the original detection sensors 320a and 320b detect the leading edge P' of the adjustment sheet P until when the image sensors 205a and 205b of the original reading portions 200a and 200b read two or more positions considered to be the leading edge P' that correspond to the first marks Q1 on the adjustment sheet P, as the reading timing adjustment time, even in the case in which the adjustment sheet P is diagonally fed, it is possible to make variations in timings at which the image sensors 205a and 205b of the original reading portions 200a and 200b read the leading edges in the first marks Q1 uniform.

Note that although in the first embodiment, the light source 211' is disposed on the upstream side in the transport direction Y1, taking the original reading position R1 as a reference, the light sources 211' may be disposed on both of the upstream side and the downstream side in the transport direction Y1, taking the original reading position R1 as a reference, and the light amount of the light source disposed on the upstream side may be greater than the light amount of the light source disposed on the downstream side.

In the first embodiment, as described above, the adjustment sheet P shown in FIG. 7 further has the second marks Q2 that are formed so as to include at least the trailing edge P'''.

The control portion 500a is configured so as to function as a means that further includes a read magnification adjustment means M3a.

The read magnification adjustment means M3a adjusts a read magnification φ in the transport direction Y1 set in advance using the first mark Q1 and the second mark Q2 on the adjustment sheet P (so as to be a normal read magnification).

Specifically, the read magnification adjustment means M3a adjusts the read magnification φ based on a read magnification adjustment time T1b from when the original reading portions 200a and 200b read the position considered to be the leading edge P' in the first mark Q1 on the adjustment sheet P until when the original reading portions 200a and 200b read the position considered to be the trailing edge P''' in the second mark Q2 on the adjustment sheet P.

Then, the control portion 500a corrects the read magnification φ based on the leading edge reading error correction time T2a.

In the first embodiment, the reading means M1a adjusts the read magnification Iφ such that the read magnification adjustment time T1b matches a reference transport time Ts set in advance for the adjustment sheet P.

Further, the read magnification adjustment means M3a adjusts the read magnification φ based on a read magnification correction adjustment time T3b' obtained by subtracting the leading edge reading error correction time T2a from the read magnification adjustment time T1b. Thus, the read magnification adjustment time T1b is set to the read magnification correction adjustment time T3b'.

Accordingly, when the read magnification correction adjustment time T3b' is shorter than the reference transport time Ts, by decreasing the transport speed V by the difference between the read magnification correction adjustment time T3b' and the reference transport time Ts, the read magnification φ is adjusted so as to be an original read magnification; on the other hand, when the read magnification correction adjustment time T3b' is longer than the reference transport time Ts, by increasing the transport speed V by the difference between the read magnification correction adjustment time T3b' and the reference transport time Ts, the read magnification φ is adjusted so as to be an original read magnification. Thereby, the read magnification φ can be adjusted with sufficient accuracy.

With such a configuration, even though the original reading portions 200a and 200b read a position earlier than the actual leading edge position due to the shadow Na when reading the leading edge P' of the adjustment sheet P, the read magnification ϕ is corrected by setting the read magnification adjustment time T1b to the read magnification correction adjustment time T3b' based on the read magnification correction adjustment time T3b' obtained by subtracting the leading edge reading error correction time T2a from the read magnification adjustment time T1b. Thereby, the read magnification adjustment time T1b can be corrected to a proper value. Therefore, the read magnification ϕ can be corrected to a proper value; accordingly, it is possible to read an original image at the accurate read magnification ϕ when reading the original G.

In addition, the read magnification ϕ can be corrected using a comparatively simple control configuration, such as that obtained by subtracting the leading edge reading error correction time T2a from the read magnification adjustment time T1b.

(Second Embodiment)

In the image reading apparatus 100b according to the second embodiment of the present invention, using the adjustment sheet P (see FIG. 7) that has the first mark Q1 formed so as to include at least the leading edge P', and the second mark Q2 formed so as to include at least the trailing edge P''' in the transport direction Y1, the read magnification p in the transport direction Y1 set in advance for the original G is adjusted. Note that in this second embodiment, the same reference numerals are given to the same elements as in the first embodiment, and a description is given mainly regarding different points from the first embodiment. This is the same in the third and fourth embodiments described later.

Figure 6:
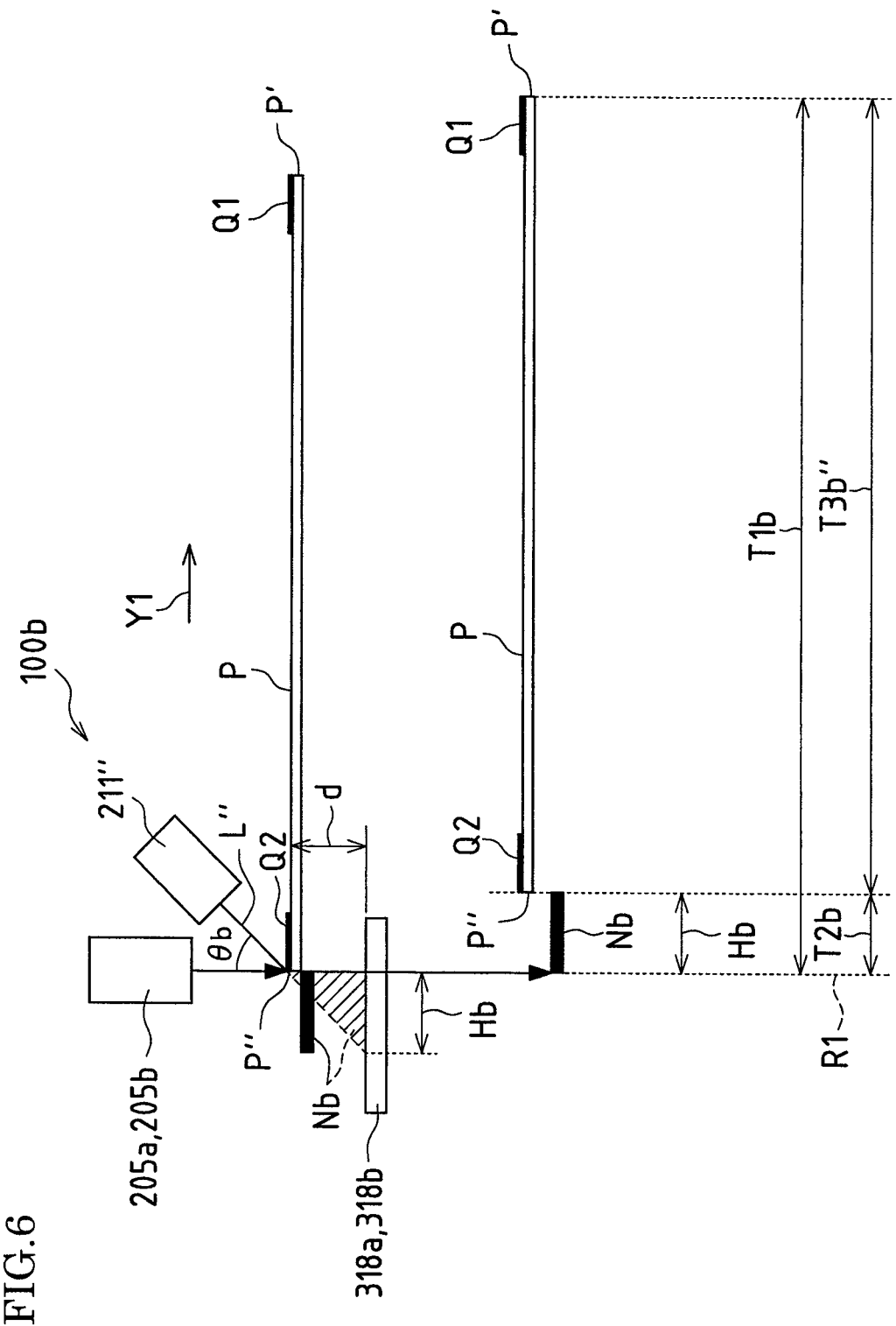
FIG. 6 is a schematic side view that illustrates an adjustment state using the adjustment sheet in the image reading apparatus of the second embodiment.

FIG. 6 is a schematic side view that illustrates an adjustment state using the adjustment sheet P in the image reading apparatus 100b of the second embodiment.

In the second embodiment, here, the light source 211" is disposed on the downstream side in the transport direction Y1, taking the original reading position R1 as a reference.

The control portion 500b shown in FIG. 4B is configured to function as a means that includes the reading means M1a and a read magnification adjustment means M3b.

The reading means M1a reads using the image sensors 205a and 205b of the original reading portions 200a and 200b in the original reading position R1, image light from the original G that is irradiated with light from the light sources 211" of the original reading portions 200a and 200b while being transported in the transport direction Y1 at the transport speed V by the original transport portion 300.

Specifically, the reading means Mia starts reading an original image after the reading start time Ta set in advance elapses after the original detection sensors 320a and 320b (that are omitted in FIG. 6, see FIG. 5) detect the transport timing of the original G (here, the leading edge G') on the upstream side in the transport direction Y1, taking the original reading position R1 as a reference.

The read magnification adjustment means M3b adjusts the read magnification ϕ in the transport direction Y1 set in advance using the first mark Q1 and the second mark Q2 on the adjustment sheet P (so as to be a normal read magnification).

Specifically, the read magnification adjustment means M3b adjusts the read magnification ϕ based on the read magnification adjustment time T1b from when the original reading portions 200a and 200b read the position considered to be the leading edge P' in the first mark Q1 on the adjustment sheet P until when the original reading portions 200a and 200b read the position considered to be the trailing edge P''' in the second mark Q2 on the adjustment sheet P.

Trailing edge reading error correction information is stored in advance in the storage portion 520b. Here, this trailing edge reading error correction information is assumed to indicate a trailing edge reading error correction time T2b corresponding to the reading error (specifically, shadow Nb) at the trailing edge P'''. The control portion 500b corrects the read magnification ϕ based on this trailing edge reading error correction time T2b.

In the second embodiment, the trailing edge reading error correction time T2b stored in advance is a time obtained by dividing a width Hb in the transport direction Y1 of the shadow Nb formed at the trailing edge P''' of the adjustment sheet P due to light L" from the light source 211" by the transport speed V.

The width Hb in the transport direction Y1 of the shadow Nb may be obtained by actually measuring the printed image, or may be calculated from an incident angle θb of the light L" from the light source 211" that emits light from a downstream side onto the adjustment sheet P transported in the transport direction Y1, and the distance d between the light irradiation surface of the adjustment sheet P and the light irradiation surfaces of the white plates 318a and 318b, using the following equation (2).

$$Hb = d \tan \theta b \qquad \text{Equation (2)}$$

In the second embodiment, the reading means M1a adjusts the read magnification ϕ such that the read magnification adjustment time T1b matches the reference transport time Ts set in advance for the adjustment sheet P.

Further, the read magnification adjustment means M3b adjusts the read magnification ϕ based on a read magnification correction adjustment time T3b" obtained by subtracting the trailing edge reading error correction time T2b from the read magnification adjustment time T1b. Thus, the read magnification adjustment time T1b is set to the read magnification correction adjustment time T3b".

Accordingly, when the read magnification correction adjustment time T3b" is shorter than the reference transport time Ts, by decreasing the transport speed V by the difference between the read magnification correction adjustment time T3b" and the reference transport time Ts, the read magnification ϕ is adjusted so as to be an original read magnification; on the other hand, when the read magnification correction adjustment time T3b" is longer than the reference transport time Ts, by increasing the transport speed V by the difference between the read magnification correction adjustment time T3b" and the reference transport time Ts, the read magnification ϕ is adjusted so as to be an original read magnification. Thereby, the read magnification ϕ can be adjusted with sufficient accuracy.

According to the image reading apparatus 100b of the second embodiment, and the image forming apparatus Da provided with the same, since the trailing edge reading error correction time T2b is stored in advance in the storage portion 520b, even though the original reading portions 200a and 200b read a position later than the actual trailing edge position due to the shadow Nb when reading the trailing edge P''' of the adjustment sheet P, the read magnification ϕ is corrected by setting the read magnification adjustment time T1b to the read magnification correction adjustment time T3b" based on the read magnification correction adjustment time T3b" obtained by subtracting the trailing edge reading error correction time T2b from the read magnification adjustment time T1b. Thereby, the read magnification adjustment time T1b can be corrected to a proper value. Therefore, the read magnification ϕ can be corrected to a proper value and, accordingly, it is possible to read an original image at the accurate read magnification ϕ when reading the original G.

In addition, the read magnification $\phi$ can be corrected using a comparatively simple control configuration, such as that obtained by subtracting the trailing edge reading error correction time T2b from the read magnification adjustment time T1b.

(Third Embodiment)

In the third embodiment, similar to the first embodiment, the light source 211' is disposed on the upstream side in the transport direction Y1, taking the original reading position R1 as a reference.

The control portion 500c of the image reading apparatus 100c shown in FIG. 4C is configured to function as a means that includes the reading means M1a and a reading timing adjustment means M2c.

The reading timing adjustment means M2c adjusts the reading start time Ta using the first mark Q1 on the adjustment sheet P. This reading timing adjustment means M2c is the same as the reading timing adjustment means M2a of the first embodiment except for not performing processing for correcting the reading timing adjustment time T1a.

As shown in FIG. 2B, in the image forming apparatus Db of the third embodiment, in response to an instruction from the main body control portion 600b, based on image information from the image reading apparatus 100c, the image forming portion 90 prints a print image on a recording sheet.

Then, since the reading timing adjustment time T1a is shorter than the original time due to the shadow Na at the leading edge P' of the adjustment sheet P, if the reading start timing is adjusted using this reading timing adjustment time T1a, image information from the image reading apparatus 100c is shifted in the transport direction Y1 of the original G, from the normal image position to the upstream side in the transport direction Y1.

In this regard, leading edge reading error correction information is stored in advance in the storage portion 620b. Here, this leading edge reading error correction information is assumed to indicate a leading edge reading error correction distance (specifically, the width of the shadow Na) Ha corresponding to the reading error (specifically, the shadow Na) at the leading edge P'.

The main body control portion 600b corrects the image position in the transport direction Y1 of a print image based on the leading edge reading error correction distance Ha. Such correction includes, for example, a mode in which the main body control portion 600b performs processing for moving image data to the downstream side in the transport direction Y1 by the leading edge reading error correction distance Ha through image processing so as to correct the image position in the transport direction Y1 of the print image, a mode in which the exposing apparatus 1 performs image writing on the photosensitive drum 3 in a position earlier by the leading edge reading error correction distance Ha so as to correct the image position in the transport direction Y1 of the print image, and a mode in which the sheet transport apparatus 50 performs belt transportation or sheet transportation that moves the intermediate transfer belt 7 or a recording sheet to the transfer portion later by the leading edge reading error correction distance Ha so as to correct the image position in the transport direction Y1 of the print image.

As shown in FIG. 4C, the control portion 500c of the image reading apparatus 100c is configured to function as a means that further includes a read magnification adjustment means M3c.

The read magnification adjustment means M3c adjusts the read magnification $\phi$ using the first mark Q1 and the second mark Q2 on the adjustment sheet P (so as to be a normal read magnification). This read magnification adjustment means M3c is the same as the read magnification adjustment means M3a of the first embodiment except for not performing processing for correcting the read magnification $\phi$.

Then, since the read magnification adjustment time T1b is longer than the original time due to the shadow Na at the leading edge P' of the adjustment sheet P, if the read magnification is adjusted using this read magnification adjustment time T1b, image information from the image reading apparatus 100c becomes image information reduced compared with that read at a normal read magnification in the transport direction Y1 of the original G.

In this regard, the main body control portion 600b shown in FIG. 2B, based on the leading edge reading error correction distance Ha, the magnification in the transport direction Y1 of a print image is corrected. Such correction includes, for example, a mode in which the main body control portion 600b performs processing in which image data is expanded by the leading edge reading error correction distance Ha through image processing so as to correct the magnification in the transport direction Y1 of a print image, and a mode in which a writing operation is performed in which a speed at which the exposing apparatus 1 performs image writing on the photosensitive drum 3 is decreased by the leading edge reading error correction distance Ha so as to correct the magnification in the transport direction Y1 of a print image.

According to the image forming apparatus Db of the third embodiment, since the leading edge reading error correction distance Ha is stored in advance in the storage portion 620b, even though the original reading portions 200a and 200b read a position earlier than the actual leading edge position when reading the leading edge P' of the adjustment sheet P, the image position in the transport direction Y1 of a print image is corrected based on the leading edge reading error correction distance Ha stored in advance. Accordingly, the print image can be printed on a recording sheet in the normal image position in the transport direction Y1.

Moreover, since the magnification in the transport direction Y1 of a print image is corrected based on the leading edge reading error correction distance Ha, even though the original reading portions 200a and 200b read a position earlier than the actual leading edge position when reading the leading edge P' of the adjustment sheet P, the magnification in the transport direction Y1 of a print image is corrected based on the leading edge reading error correction distance Ha stored in advance. Accordingly, the print image can be printed on a recording sheet at the normal magnification in the transport direction Y1.

Further, in the image forming apparatus Db of the third embodiment that also operates as an image processing apparatus, based on image information from the image reading apparatus 100c, the main body control portion 600b creates prescribed image data, such as PDF data.

The main body control portion 600b corrects the image position in the transport direction Y1 of image data based on the leading edge reading error correction distance Ha. Furthermore, the main body control portion 600b corrects the magnification in the transport direction Y1 of image data based on the leading edge reading error correction distance Ha. Various conventional techniques can be adopted for such image position correction and magnification correction, and a detailed description thereof is omitted here.

According to the image forming apparatus Db of the third embodiment that also operates as an image processing apparatus, since the leading edge reading error correction distance Ha is stored in advance in the storage portion 620b, even though the original reading portions 200a and 200b read a position earlier than the actual leading edge position when reading the leading edge P' of the adjustment sheet P, based on the leading edge reading error correction distance Ha stored in advance, the image position in the transport direction Y1 of image data is corrected. Accordingly, the image data can be created in the normal image position in the transport direction Y1.

Moreover, since the magnification in the transport direction Y1 of image data is corrected based on the leading edge reading error correction distance Ha, even though the original reading portions 200a and 200b read a position earlier than the actual leading edge position when reading the leading edge P' of the adjustment sheet P, based on the leading edge reading error correction distance Ha stored in advance, the magnification in the transport direction Y1 of image data is corrected. Accordingly, the image data can be created at the normal magnification in the transport direction Y1.

(Fourth Embodiment)

In the fourth embodiment, similar to the second embodiment, the light source 211" is disposed on the downstream side in the transport direction Y1, taking the original reading position R1 as a reference.

The control portion 500d of the image reading apparatus 100d shown in FIG. 4C is configured to function as a means that includes the reading means M1a and the read magnification adjustment means M3c.

The read magnification adjustment means M3c adjusts the read magnification φ using the first mark Q1 and the second mark Q2 on the adjustment sheet P (so as to be a normal read magnification). This read magnification adjustment means M3c is the same as the read magnification adjustment means M3b of the second embodiment, except for not performing processing for correcting the read magnification φ.

As shown in FIG. 2C, the image forming apparatus Dc of the fourth embodiment, in response to an instruction from the main body control portion 600c, uses the image forming portion 90 to print a print image on a recording sheet based on image information from the image reading apparatus 100d.

Since the read magnification adjustment time T1b is longer than the original time due to the shadow Nb at the trailing edge P'" of the adjustment sheet P, if the read magnification is adjusted using this read magnification adjustment time T1b, image information from the image reading apparatus 100d is reduced in the transport direction Y1 of the original G compared with that read at the normal read magnification.

In this regard, the trailing edge reading error correction information is stored in advance in the storage portion 620c. Here, this trailing edge reading error correction information is assumed to indicate the trailing edge reading error correction distance (specifically, the width of the shadow Nb) Hb corresponding to the reading error (specifically, the shadow Nb) at the trailing edge P'".

The main body control portion 600c corrects the magnification in the transport direction Y1 of a print image based on this trailing edge reading error correction distance Hb. Such correction includes, for example, a mode in which the main body control portion 600c perform processing in which image data is expanded by the trailing edge reading error correction distance Hb through image processing so as to correct the magnification in the transport direction Y1 of a print image, and a mode in which a writing operation is performed in which a speed at which the exposing apparatus 1 performs image writing on the photosensitive drum 3 is decreased by the trailing edge reading error correction distance Hb so as to correct the magnification in the transport direction Y1 of a print image.

According to the image forming apparatus Dc of the fourth embodiment, since the trailing edge reading error correction distance Hb is stored in advance in the storage portion 620c, even though the original reading portions 200a and 200b read a position later than the actual trailing edge position when reading the trailing edge P'" of the adjustment sheet P, based on the trailing edge reading error correction distance Hb stored in advance, the magnification in the transport direction Y1 of a print image is corrected. Accordingly, the print image can be printed on a recording sheet at the normal magnification in the transport direction Y1.

Further, in the image forming apparatus Dc of the fourth embodiment that also operates as an image processing apparatus, based on image information from the image reading apparatus 100d, the main body control portion 600c creates prescribed image data, such as PDF data.

The main body control portion 600c corrects the magnification in the transport direction Y1 of image data based on the trailing edge reading error correction distance Hb. Various conventional techniques can be adopted for such magnification correction, and a detailed description thereof is omitted here.

According to the image forming apparatus Dc of the fourth embodiment that also operates as an image processing apparatus, since the trailing edge reading error correction distance Hb is stored in advance in the storage portion 620c, even though the original reading portions 200a and 200b read a position later than the actual trailing edge position when reading the trailing edge P'" of the adjustment sheet P, the magnification in the transport direction Y1 of image data is corrected based on the trailing edge reading error correction distance Hb stored in advance. Accordingly, the image data can be created at the normal magnification in the transport direction Y1.

The present invention may be embodied in various other forms without departing from the spirit or essential characteristics thereof. Therefore, the embodiments and examples disclosed in this application are to be considered in all respects as illustrative and not limiting. The scope of the invention is indicated by the appended claims rather than by the foregoing description. All variations and modifications falling within the equivalency range of the appended claims are intended to be embraced therein.

What is claimed is:

1. An image reading apparatus, comprising:
a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and
a reading timing adjustment section that adjusts the reading start time using a first mark on an adjustment sheet that has the first mark formed at least at a downstream side edge in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and the image reading apparatus correcting a reading start timing of an original based on downstream side edge reading error correction information stored in advance,
wherein
the light source emits light from at least the upstream side among the upstream side and a downstream side in the transport direction, taking the original reading position as a reference, and
the downstream side edge reading error correction information stored in advance indicates a downstream side edge reading error correction time obtained by dividing a width in the transport direction of a shadow at the downstream side edge in the transport direction of the adjustment sheet due to light from the light source by the transport speed.

2. The image reading apparatus according to claim 1, wherein
the downstream side edge reading error correction information indicates the downstream side edge reading error correction time, and
the reading timing adjustment section adjusts the reading start time based on a reading timing correction adjustment time obtained by adding the downstream side edge reading error correction time to the reading timing adjustment time.

3. The image reading apparatus according to claim 1, wherein the adjustment sheet further has a second mark that is formed at least at an upstream side edge in the transport direction.

4. The image reading apparatus according to claim 3, further comprising
a read magnification adjustment section that adjusts a read magnification in the transport direction set in advance using the first mark and the second mark on the adjustment sheet, the read magnification adjustment section adjusting the read magnification based on a read magnification adjustment time from when the original reading portion reads a position considered to be the downstream side edge in the transport direction in the first mark on the adjustment sheet until when the original reading portion reads a position considered to be the upstream side edge in the transport direction in the second mark on the adjustment sheet, and
the image reading apparatus correcting the read magnification based on the downstream side edge reading error correction information.

5. The image reading apparatus according to claim 4, wherein
the downstream side edge reading error correction information indicates the downstream side edge reading error correction time, and
the read magnification adjustment section adjusts the read magnification based on a read magnification correction adjustment time obtained by subtracting the downstream side edge reading error correction time from the read magnification adjustment time.

6. The image reading apparatus according to claim 1, wherein on the adjustment sheet, one or two or more of the first marks are formed along a direction that is orthogonal to the transport direction.

7. The image reading apparatus according to claim 6, wherein the reading timing adjustment section uses a time obtained by averaging each time from when the transport timing of the adjustment sheet is detected until when the original reading portion reads two or more positions considered to be the downstream side edge that correspond to the first marks on the adjustment sheet as the reading timing adjustment time.

8. The image reading apparatus according to claim 1, wherein
a reading member whose at least light irradiation surface is white or has half tone darkness, the reading member being read by the original reading portion when an original is not being transported, and provided to a side opposite a reading side of the original reading position with an original transport path therebetween, and
a darkness of the first mark and the second mark that are formed on the adjustment sheet is a darkness whose difference from the darkness of the light irradiation surface of the reading member can be recognized when the original reading portion performs reading, and is black or half tone darkness that is darker than the darkness of the light irradiation surface of the reading member.

9. The image reading apparatus according to claim 1, wherein the adjustment sheet is a sheet printed by an image forming apparatus provided with the image reading apparatus.

10. An image reading apparatus, comprising:
a reading section that reads, in a prescribed original reading position using an original reading portion, image light from an original that is irradiated with light from a light source of the original reading portion while being transported in a prescribed transport direction at a prescribed transport speed by an original transport portion; and
a read magnification adjustment section that adjusts a read magnification in the transport direction set in advance using a first mark and a second mark on an adjustment sheet that has the first mark that is formed at least at a downstream side edge in the transport direction, and the second mark that is formed at least at an upstream side edge in the transport direction, the read magnification adjustment section adjusting the read magnification based on a read magnification adjustment time from when the original reading portion reads a position considered to be a downstream side edge in the transport direction in the first mark on the adjustment sheet until when the original reading portion reads a position considered to be an upstream side edge in the transport direction in the second mark on the adjustment sheet, and
the image reading apparatus correcting the read magnification based on upstream side edge reading error correction information stored in advance.

11. The image reading apparatus according to claim 10, wherein
the light source emits light from at least a downstream side among an upstream side and the downstream side in the transport direction, taking the original reading position as a reference, and
the upstream side edge reading error correction information stored in advance indicates an upstream side edge reading error correction time obtained by dividing a width in the transport direction of a shadow at the upstream side edge in the transport direction of the adjustment sheet due to light from the light source by the transport speed.

12. The image reading apparatus according to claim 10, wherein
the upstream side edge reading error correction information indicates the upstream side edge reading error correction time, and
the read magnification adjustment section adjusts the read magnification based on a read magnification correction adjustment time obtained by subtracting the upstream side edge reading error correction time from the read magnification adjustment time.

13. An image forming apparatus provided with the image reading apparatus according to claim 1.

14. An image forming apparatus that prints a print image on a recording sheet from image information from an image reading apparatus including:
- a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and
- a reading timing adjustment section that adjusts the reading start time using a first mark on an adjustment sheet that has the first mark formed at least at a downstream side edge in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and
- the image forming apparatus correcting an image position in the transport direction of the print image based on downstream side edge reading error correction information stored in advance, wherein
the adjustment sheet further has a second mark that is formed at least at an upstream side edge in the transport direction,
the image reading apparatus further includes a read magnification adjustment section that adjusts a read magnification in the transport direction set in advance using the first mark and the second mark on the adjustment sheet, the read magnification adjustment section adjusting the read magnification based on a read magnification adjustment time from when the original reading portion reads a position considered to be the downstream side edge in the transport direction in the first mark on the adjustment sheet until when the original reading portion reads a position considered to be the upstream side edge in the transport direction in the second mark on the adjustment sheet, and
the image forming apparatus corrects a magnification in the transport direction of the print image based on the downstream side edge reading error correction information.

15. An image forming apparatus that prints a print image on a recording sheet from image information from an image reading apparatus including:
- a reading section that reads, in a prescribed original reading position using an original reading portion, image light from an original that is irradiated with light from a light source of the original reading portion while being transported in a prescribed transport direction at a prescribed transport speed by an original transport portion; and
- a read magnification adjustment section that adjusts a read magnification in the transport direction set in advance using a first mark and a second mark on an adjustment sheet that has the first mark formed at least at a downstream side edge in the transport direction, and the second mark formed at least at an upstream side edge in the transport direction, the read magnification adjustment section adjusting the read magnification based on a read magnification adjustment time from when the original reading portion reads a position considered to be a downstream side edge in the transport direction in the first mark on the adjustment sheet until when the original reading portion reads a position considered to be an upstream side edge in the transport direction in the second mark on the adjustment sheet, and
- the image forming apparatus correcting a magnification in the transport direction of the print image based on upstream side edge reading error correction information stored in advance.

16. An image processing apparatus that creates prescribed image data from image information from an image reading apparatus including:
- a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and
- a reading timing adjustment section that adjusts the reading start time using a first mark on an adjustment sheet that has the first mark formed at least at a downstream side edge in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and
- the image processing apparatus correcting an image position in the transport direction of the image data based on downstream side edge reading error correction information stored in advance, wherein
the adjustment sheet further has a second mark that is formed at least at an upstream side edge in the transport direction,
the image reading apparatus further includes a read magnification adjustment section that adjusts a read magnification in the transport direction set in advance using the first mark and the second mark on the adjustment sheet, the read magnification adjustment section adjusting the read magnification based on a read magnification adjustment time from when the original reading portion reads a position considered to be the downstream side edge in the transport direction in the first mark on the adjustment sheet until when the original reading portion reads a position considered to be the upstream side edge in the transport direction in the second mark on the adjustment sheet, and the image processing apparatus corrects a magnification in the transport direction of the image data based on the downstream side edge reading error correction information.

17. An image processing apparatus that creates prescribed image data from image information from an image reading apparatus including:
- a reading section that reads, in a prescribed original reading position using an original reading portion, image light from an original that is irradiated with light from a light source of the original reading portion while being transported in a prescribed transport direction at a prescribed transport speed by an original transport portion; and
- a read magnification adjustment section that adjusts a read magnification in the transport direction set in advance using a first mark and a second mark on an adjustment sheet that has the first mark formed at least at a downstream side edge in the transport direction, and the second mark formed at least at an upstream side edge in the transport direction, the read magnification adjustment section adjusting the read magnification based on a read magnification adjustment time from when the original reading portion reads a position considered to be a downstream side edge in the transport direction in the first mark on the adjustment sheet until when the original reading portion reads a position considered to be an upstream side edge in the transport direction in the second mark on the adjustment sheet, and
- the image processing apparatus correcting a magnification in the transport direction of the image data based on upstream side edge reading error correction information stored in advance.

18. An image reading apparatus, comprising:
- a reading section that reads, in a prescribed original reading position using an original reading portion, image light from an original that is irradiated with light from a light source of the original reading portion while being transported in a prescribed transport direction at a prescribed transport speed by an original transport portion, the reading section starting reading an original image after a reading start time set in advance has elapsed since detecting a transport timing of an original on an upstream side in the transport direction relative to the original reading position; and
- a reading timing adjustment section that adjusts the reading start time using a first mark on an adjustment sheet that has the first mark formed at least at a downstream side edge in the transport direction, the reading timing adjustment section adjusting the reading start time based on a reading timing adjustment time from when a transport timing of the adjustment sheet transported by the original transport portion is detected on the upstream side in the transport direction relative to the original reading position until when the original reading portion reads a position considered to be a downstream side edge in the transport direction in the first mark on the adjustment sheet, and
- the image reading apparatus correcting a reading start timing of an original based on downstream side edge reading error correction information stored in advance, wherein
the downstream side edge reading error correction information indicates the downstream side edge reading error correction time, and
the reading timing adjustment section adjusts the reading start time based on a reading timing correction adjustment time obtained by adding the downstream side edge reading error correction time to the reading timing adjustment time.

* * * * *